United States Patent
Tojo

(10) Patent No.: US 7,391,436 B2
(45) Date of Patent: Jun. 24, 2008

(54) IMAGE PROCESSING APPARATUS WITH COMPARING OF DIFFERENCE OF CAMERA OPERATION INFORMATION BETWEEN IMAGE DATA OF PLURAL SECTIONS IN INPUT IMAGE DATA

(75) Inventor: Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 674 days.

(21) Appl. No.: 10/216,748

(22) Filed: Aug. 13, 2002

(65) Prior Publication Data

US 2003/0043276 A1    Mar. 6, 2003

(30) Foreign Application Priority Data

Aug. 28, 2001  (JP)  ............................... 2001-257923
Sep. 28, 2001  (JP)  ............................... 2001-302970

(51) Int. Cl.
*H04N 5/225* (2006.01)
*H04N 5/228* (2006.01)
*H04N 5/93* (2006.01)

(52) U.S. Cl. ............................... 348/207.99; 348/222.1; 386/52

(58) Field of Classification Search ............ 348/333.05, 348/207.99, 207.1, 231.6; 386/52, 125, 107
See application file for complete search history.

(56) References Cited

U.S. PATENT DOCUMENTS

| | | | | |
|---|---|---|---|---|
| 5,537,530 | A | * | 7/1996 | Edgar et al. .................. 715/723 |
| 6,005,613 | A | * | 12/1999 | Endsley et al. ........... 348/231.6 |
| 6,580,437 | B1 | * | 6/2003 | Liou et al. ................... 715/719 |
| 6,771,285 | B1 | * | 8/2004 | McGrath et al. ............. 715/723 |
| 2003/0112357 | A1 | * | 6/2003 | Anderson ............... 348/333.05 |
| 2004/0101279 | A1 | * | 5/2004 | Ikeda et al. ..................... 386/52 |

FOREIGN PATENT DOCUMENTS

| | | | |
|---|---|---|---|
| EP | 1143449 A1 | * | 10/2001 |
| JP | 9-37150 | | 2/1997 |
| JP | 11164236 A | * | 6/1999 |

* cited by examiner

*Primary Examiner*—David Ometz
*Assistant Examiner*—Luong T Nguyen
(74) *Attorney, Agent, or Firm*—Fitzpatrick, Cella, Harper & Scinto

(57) ABSTRACT

The invention provides an image processing apparatus, capable of selecting arbitrary plural sections in input image data, designating an order of reproduction of the image data of the selected plural sections, comparing the camera operation information relating to the image data of the selected plural sections with a predetermined rule relating to the camera operation information, and issuing predetermined warning information when the camera operation information of the plural sections violates the predetermined rule.

23 Claims, 21 Drawing Sheets

FIG. 7

WHITE BALANCE MODE

| BINARY CODE | WHITE BALANCE MODE |
|---|---|
| 0 0 0 | AUTOMATIC |
| 0 0 1 | HOLD |
| 0 1 0 | ONE PUSH |
| 0 1 1 | PRESET |
| 1 1 1 | NO INFORMATION |

FOCAL MODE

| BINARY CODE | FOCAL MODE |
|---|---|
| 0 | AUTOMATIC |
| 1 | MANUAL |

FOCUS DISTANCE
$M \times 10^L$ [cm]
    M : 5 BIT INTEGER
    L : 2 BIT INTEGER

FIG. 8

ZOOM (EACH FRAME)

| BINARY CODE | ZOOM BUTTON |
|---|---|
| 0 | OFF |
| 1 | ON |

| BINARY CODE | DIRECTION OF ZOOM |
|---|---|
| 0 | ZOOM-IN |
| 1 | ZOOM OUT |

| BINARY CODE | INTENSITY OF ZOOM |
|---|---|
| 0 0 0 0 0 0 | LEVEL 0 |
| 0 0 0 0 0 1 | LEVEL 1 |
| 0 0 0 0 1 0 | LEVEL 2 |
| 0 0 0 0 1 1 | LEVEL 3 |
| 0 0 0 1 0 0 | LEVEL 4 |
| HENCEFORTH | UNDEFINED |

PAN (EACH FRAME)

| BINARY CODE | PAN |
|---|---|
| 0 | NO PANNING |
| 1 | PANNING |

| BINARY CODE | DIRECTION OF PANNING |
|---|---|
| 0 | PAN TO LEFT |
| 1 | PAN TO RIGHT |

| BINARY CODE | INTENSITY OF PAN |
|---|---|
| 0 0 0 0 0 0 | LEVEL 0 |
| 0 0 0 0 0 1 | LEVEL 1 |
| 0 0 0 0 1 0 | LEVEL 2 |
| 0 0 0 0 1 1 | LEVEL 3 |
| 0 0 0 1 0 0 | LEVEL 4 |
| HENCEFORTH | UNDEFINED |

| CLIP ID | START POINT | END POINT |
|---|---|---|
| 1 | 1 | 300 |
| 4 | 55 | 625 |
| 2 | 1 | 350 |
| ⋮ | ⋮ | ⋮ |

1900

| CLIP ID | LENGTH OF CLIP | THUMBNAIL IMAGE |
|---------|----------------|-----------------|
| 1 | 450 | THUMBNAIL IMAGE 1 |
| 2 | 381 | THUMBNAIL IMAGE 2 |
| 3 | 251 | THUMBNAIL IMAGE 3 |
| 4 | 1055 | THUMBNAIL IMAGE 4 |
| ⋮ | ⋮ | ⋮ |

| CLIP ID | START POINT | END POINT |
|---|---|---|
| 1 | 1 | 300 |
| 4 | 55 | 595 |
| 10000 | 1 | 60 |
| 2 | 31 | 350 |
| ⋮ | ⋮ | ⋮ |

| START POINT | END POINT | KIND OF CAMERA OPERATION INFORMATION | OPERATION INFORMATION PARAMETER |
|---|---|---|---|
| 1 | 30 | PAN | RIGTH DIRECTION |
| 581 | 699 | TILT | UP DIRECTION |
| ⋮ | ⋮ | ⋮ | ⋮ |

IMAGE PROCESSING APPARATUS WITH COMPARING OF DIFFERENCE OF CAMERA OPERATION INFORMATION BETWEEN IMAGE DATA OF PLURAL SECTIONS IN INPUT IMAGE DATA

BACKGROUND OF THE INVENTION

1. Field of the Invention

The present invention relates to an image processing apparatus, and more particularly to an apparatus for editing image information utilizing camera information at the photographing of the image information.

2. Related Background Art

In case of a conventional editing operation in an image editing apparatus for editing moving images obtained by photographing with a video camera or the like, the user determines necessary sections in the images to be edited and records the scenes of such sections in succession. The result of such recording constitutes the result of image editing.

In case the user executing such image editing is a professional user involved in the image production, such user in general has technology for obtaining images of strong impact by combining presentations (scenes) obtained by various camera operations such as panning, tilting, zooming etc. of the camera and selection of various camera angles.

On the other hand, for a non-professional or amateur user, it is difficult to obtain satisfactory images such as images of strong impact as the result of editing, because of lack of the knowledge on the presentations by various camera operations or the image effect obtained by the combination thereof.

Therefore, an image editing apparatus disclosed in the Japanese Patent Application Laid-open No. 9-37150 is provided with a dictionary showing correspondence between the presentation in natural language such as "thrilling" and the image effect by a camera operation, thereby enabling to easily obtain a result of highly advanced image editing by designating an image effect from the user with a natural language.

However, in the conventional image editing apparatus as explained in the foregoing, in which the image effect is designated by the natural language presentation, it has not been possible to adapt to the difference in the subjectivity of each user. For example a presentation by a natural language "thrilling" may be felt in different levels among the users and it is extremely difficult to adapt to such difference.

Also it has been necessary for the user to in advance determine the image effects to be adopted prior to the actual image editing operation, so that it is extremely difficult for the user to realize such image editing operation as to expand the idea freely in the course of execution of the editing operation.

SUMMARY OF THE INVENTION

In consideration of the foregoing, an object of the present invention is to resolve the aforementioned drawbacks.

Another object of the present invention is to allow to obtain satisfactory edited images even for a non-professional user who is not specialized in editing operation.

Still another object of the present invention is to enable satisfactory editing process corresponding to the camera operation at the photographing operation.

The above-mentioned objects can be attained, according to an embodiment of the present invention, by an image processing apparatus comprising:

input means for entering image data and camera operation information relating to the image data;

designation means for selecting arbitrary plural sections in the entered image data and designating an order of reproduction of the image data of the selected plural sections; and control means for comparing the camera operation information relating to the image data of the selected plural sections and a predetermined rule relating to the camera operation information, and issuing predetermined alarm information when the camera operation information of the plural sections violates the predetermined rule.

Still other objects of the present invention, and the features thereof, will become fully apparent from the following detailed description of the embodiments, to be taken in conjunction with the accompanying drawings.

BRIEF DESCRIPTION OF THE DRAWINGS

FIGS. 7 and 8 are views showing the content of camera operation information;

DETAILED DESCRIPTION OF THE PREFERRED EMBODIMENTS

Now the present invention will be clarified in detail by preferred embodiments, with reference to the accompanying drawings.

First Embodiment

Figure 1:
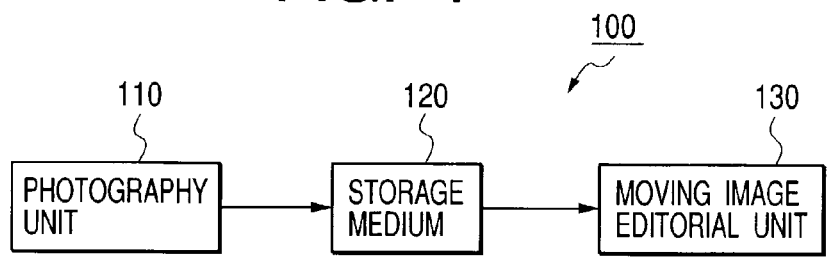
FIG. 1 is a view showing the configuration of a moving image editing system in which the present invention is applicable.

The present invention is applicable for example to a moving image editing system 100 as shown in FIG. 1.

The moving image editing apparatus 100 of the present embodiment is so constructed as to enable, even for a user poor in knowledge on the image effect in editing a moving image, the desired image editing operation in arbitrary manner and to easily obtain the result of a highly advanced image editing.

In the following, there will be given an explanation on the configuration and function of the moving image editing system 100 of the present embodiment.

As shown in FIG. 1, the moving image editing system 100 is provided with a photography unit 110 for photographing an object and obtaining a moving image, a storage medium 120 in which image data obtained in the photography unit 110 are recorded, and a moving image editorial unit 130 for editing, according to an instruction from the user, the image data recorded on the storage medium 120.

Figure 2:
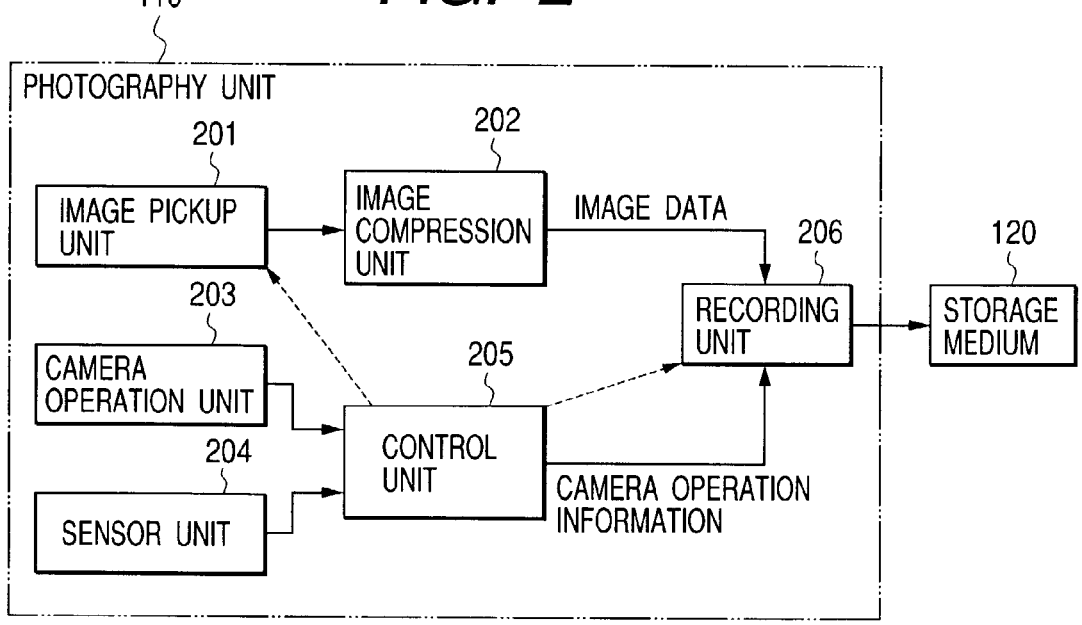
FIG. 2 is a view showing the configuration of a photography unit.

The photography unit 110 is provided, as shown in FIG. 2, with an image pickup unit 201, an image compression unit 202, a camera operation unit 203, a sensor unit 204, a control unit 205 and a storage unit 206.

The image pickup unit 201 photographs the object with a configuration including a lens, an image pickup element, an A/D converter etc. and acquires and outputs moving image data of the object. The image compression unit 202 executes a compression encoding process based on an algorithm of a predetermined compression method on the image data obtained in the image pickup unit 201. Such compression method can be, for example, a method utilizing DCT (discrete cosine transformation) and VLC (variable length coding) employed in the DV standard for the consumer digital VCR, or MPEG-1 (moving picture experts group) or MPEG-2 utilizing DCT and motion compensation anticipation.

The camera operation unit 203 is provided with a photographing start button, a zoom button etc. and enters operation information based on the operation of these operation buttons by the user. The sensor unit 204 is provided with various sensors for detecting the state of the image pickup unit 201 (hereinafter also called camera state), and acquires information (hereinafter also called sensor information) indicating the result of detection in the image pickup unit 201 such as the diaphragm aperture or the focal length. The control unit 205 control the entire operation of the photography unit 110, and controls the image pickup operation of the image pickup unit 201 based on the user operation information entered from the camera operation unit 203 and the information obtained in the sensor unit 204.

The recording unit 206 records, on the storage medium 120, the image data after compression encoding obtained in the image compression unit 202 and the camera operation information (including the user operation information from the camera operation unit 203 and the sensor information from the sensor unit 204) from the control unit 205, in multiplexed manner under mutual timing control.

The storage medium 120 records, by the recording unit 206 of the photography unit 110, data in which the image data and the camera operation information are multiplexed, and such storage medium 120 can be, for example, a magnetic tape, a magnetooptical disk or a hard disk.

Figure 3:
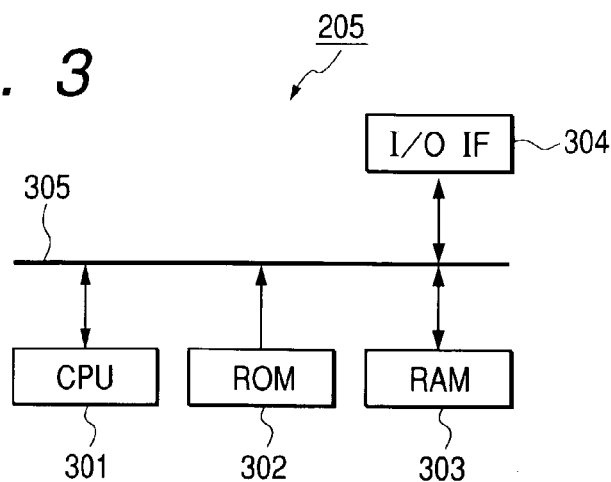
FIG. 3 is a view showing the configuration of a control unit in FIG. 2.

FIG. 3 is a block diagram showing the configuration of the control unit 205.

The control unit 205 is provided, as shown in FIG. 3, with a CPU 301, a ROM 302, a RAM 303, an I/O interface 304 and a bus 305, which are already known. The ROM 302 stores programs to be executed by the CPU 301 as will be explained later, and table values.

Figure 4:
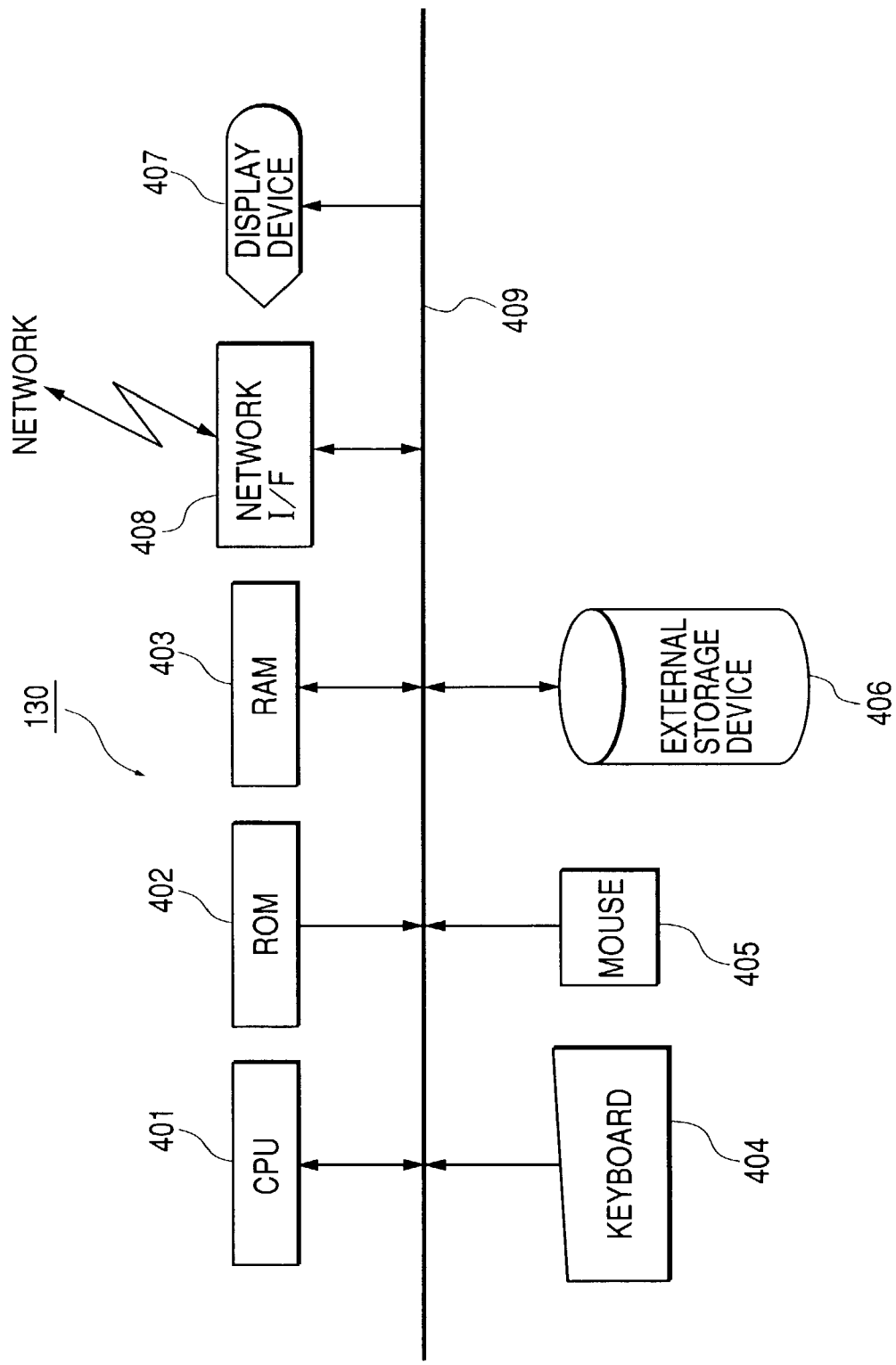
FIG. 4 is a view showing the configuration of a moving image editorial unit.

FIG. 4 specifically shows the control configuration of the moving image editing unit 130.

The moving image editing unit 130 is provided with a CPU 401, a ROM 402, a RAM 403, a keyboard 404, a mouse 405, an external storage apparatus 406, a display device 407 and a network I/F 408, which are connected by a bus 409 in mutually communicable manner.

The CPU 401 executes a predetermined processing program and controls the operation of the entire moving image editing unit 130. The ROM 402 stores a boot program to be executed at the start-up of the image editing apparatus 100, programs to be executed by the CPU 401 and various data. The RAM 403 provides an area in which the program to be executed by the CPU 401 is developed and a work area therefor.

The keyboard 404 and the mouse 405 provide the environment for various input operations by the user. The external storage apparatus 406 can be composed, for example, of a hard disk, a flexible disk or a CD-ROM. The display device 407 includes a display and a display driver and display results of various processes to the user. The network I/F 408 is used for enabling communication with an apparatus or a system on the network.

Figure 5:
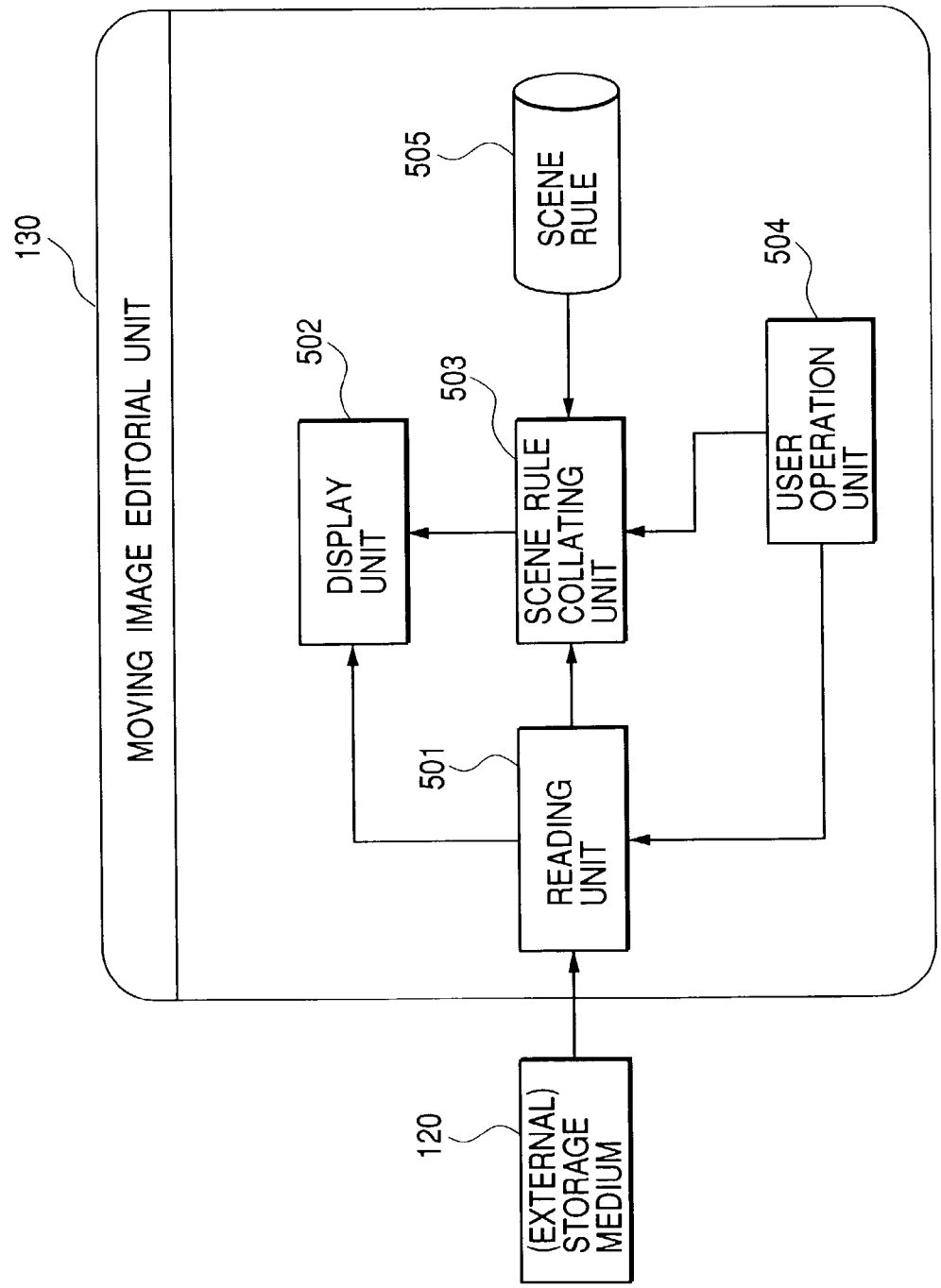
FIG. 5 is a functional block diagram of the moving image editorial unit.

FIG. 5 shows the functional configuration of the moving image editing unit 130.

The moving image editing unit 130 is provided with a reading unit 501, a display unit 502, a scene rule collating unit 503, a user operation unit 504, and a scene rule storage unit 505.

The reading unit 501 reads data from an arbitrary position (address) in the storage medium 120, and acquires image data and camera operation information from thus read data. The reading unit 501 may have a configuration such as of a CD-ROM drive for reading data directly from the storage medium 120, or a configuration of reading data from a drive apparatus incorporated in the photographing unit 110 through an interface such as IEEE 1394.

The display unit 502 displays, to the user, state in the course of image editing or result thereof. The scene rule collating unit 503 executes collation of a scene rule to be explained later with the camera operation information corresponding to the image data under editing, and gives a warning to the user based on the result of such collation. The user operation unit 504 accepts user operations necessary for the image editing, such as designation of scene sections in the image under editing.

The scene rule storage unit 505 stores a scene rule, describing the rules necessary for enhancing the image effect such as ease of viewing or emphasis of the image.

Figure 6:
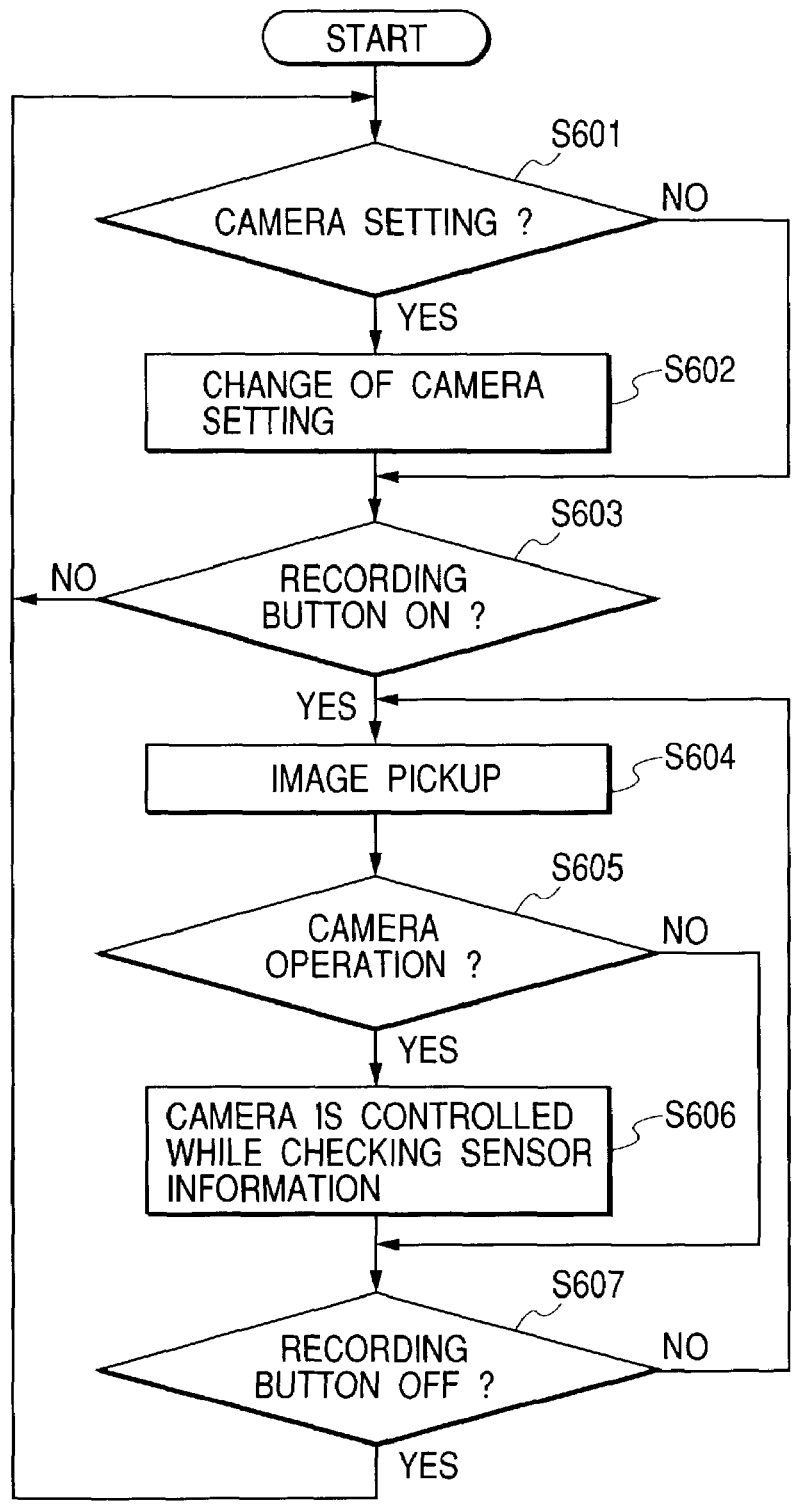
FIG. 6 is a flow chart showing the functions of the photography unit.

The function of the photography unit 110 is shown by a flow chart in FIG. 6.

At first, in a step S601, the control unit 205 discriminates whether the user has executed camera setting for the image pickup unit 201 in the camera operation unit 203. The camera setting includes, for example, the settings for focusing mode (automatic/manual), exposure mode (automatic, gain priority, shutter speed priority, diaphragm priority or manual), and white balance mode (automatic, hold, one-push or preset).

If the discrimination identifies that the camera setting has been executed, the sequence proceeds to a step S602, but, if the camera setting has not been executed, the sequence skips the step S602 and proceeds a step S603 to be explained later.

If the discrimination of the step S601 identifies that the camera setting has been executed, the control unit 205 changes the current camera setting of the image pickup unit 210 based on such camera setting, and supplies the camera setting information after such change (information of the camera setting made by the user) as the camera operation information to the storage unit 206 (step S602).

After the process of the step S602 or in case the step S601 identifies the absence of camera setting, the control unit 205 discriminates whether a recording button (not shown) provided in the camera operation unit 203 has been operated by the user to instruct the start of recording. If the discrimination identifies that the recording button is turned on, the sequence proceeds to a next step S604, but, if the recording button is not turned on, a stand-by state is identified and the sequence returns to the step S601 (step S603).

If the discrimination of the step S603 identifies that the recording button has been turned on, the control unit 205 shifts the image pickup unit 201 to a recording state (recording mode) and sends information of the recording start time as camera operation information to the recording unit 206. In response to the instruction for recording mode from the control unit 205, the photography unit 110 takes the image of an object and outputs the obtained image data to the image compression unit 202. The image compression unit 202 executes compression encoding of the image data from the image pickup unit 201, for supply to the recording unit 206 (step S604).

Then the control unit 205 discriminates whether the user has executed a camera operation for the image pickup unit 201 in the camera operation unit 203. The camera operation means, for example, on/off operation of a zoom button, panning or tilting of the camera. If the discrimination identifies that the camera operation has been executed, the sequence proceeds to a step S606, but, if the camera operation has not been executed, the sequence skips the step S606 and proceeds a step S607 to be explained later (step S605).

If the discrimination of the step S605 identifies that the camera operation has been executed, the control unit 205 controls the image pickup unit 201 based on the sensor information from the sensor unit 204. The sensor information includes, for example, the focal length, focused distance and result of hand vibration in the image pickup unit 201. More specifically, in case a zoom operation by the user is identified, the control unit 205 drives a lens (not shown) provided in the image pickup unit 201 only for a section of the zoom operation (section in which the zoom button is depressed), thereby executing a zooming operation. Also in the image pickup unit 201, there is executed an operation for focusing, based on the sensor information on the focal length and focused distance from the sensor unit 204. In such state, the control unit 205 supplies the recording unit 206 with the sensor information (focal length and focused distance) outputted from the sensor unit 204 as the camera operation information for each frame (step S606).

The recording unit 206 records, on the storage medium 120, the camera operation information supplied from the control unit 205 for each frame and the image data after compression encoding supplied from the image compression unit 202, in multiplexed manner. The multiplexing can be achieved for example by a method standardized in the MPEG-2 system, in which the image data and the camera operation information are respectively packetized in PES (packetized elementary stream) and are formed into multiplex streams of TS (transport stream) or PS (program stream).

After the process of the step S606 or in case the step S605 identifies the absence of camera operation, the control unit 205 discriminates whether the user has turned off the recording button to instruct the termination of recording. If the discrimination identifies that the recording button is turned off, a stand-by state is identified and the sequence returns to the step S601, but, if the recording button is not turned off, it is identified that the photographing state is still maintained and the sequence returns to the step S604. In the present embodiment, a data stream multiplexing the moving image data and the camera operation information, recorded from the start of recording by turning on the recording button to the end of recording by turning off the recording button, forms a clip.

In the present embodiment, the camera operation information consists of the information obtained in the camera operation unit 203 and the information obtained in the sensor unit 204.

The format of the camera operation information can be, for example, a format adopted in the DV standard as shown in FIG. 7, or a format as shown in FIG. 8. FIGS. 7 and 8 illustrate only a part of the format for the purpose of clarification.

Figure 9:
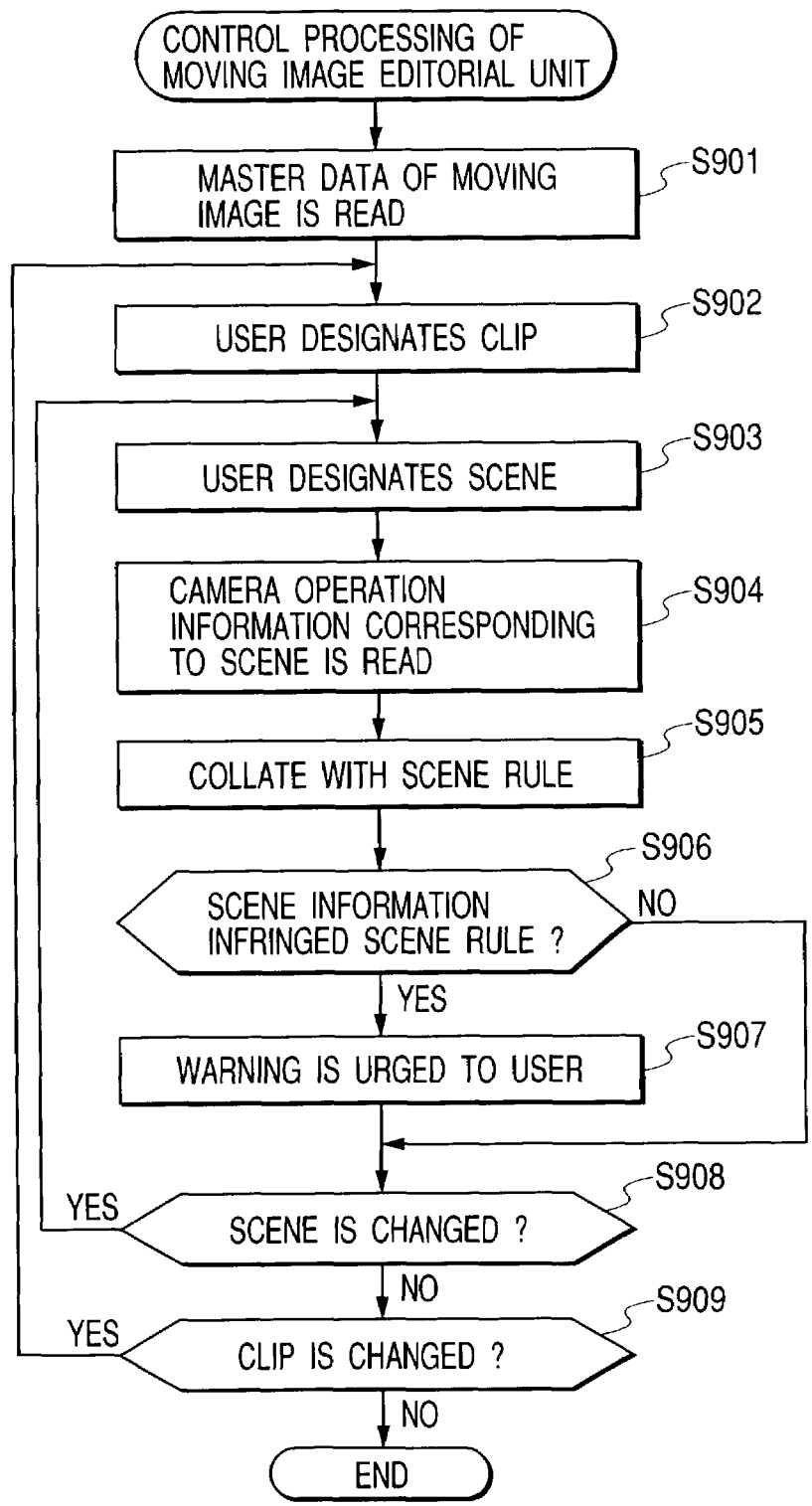
FIG. 9 is a flow chart showing the control sequence of the moving image editorial unit.

In the following, there will be explained the process in the moving image editorial unit 130. FIG. 9 is a flow chart showing the sequence of a control process to be executed by the moving image editorial unit 130.

At first, in a step S901, the reading unit 501 reads, from the storage medium 120, base data on the recorded moving image data. The moving image data stored in the storage medium 120 may be formed into a file for each clip or a file for plural clips. In the present embodiment, there will be explained a case where a file is generated for each clip. Also the base data are for example an ID of a file containing the data of each clip, the length of each file (for example number of frames), and a thumbnail image of a starting frame of each clip and includes information to the displayed on a user interface to be explained later.

Figure 10:
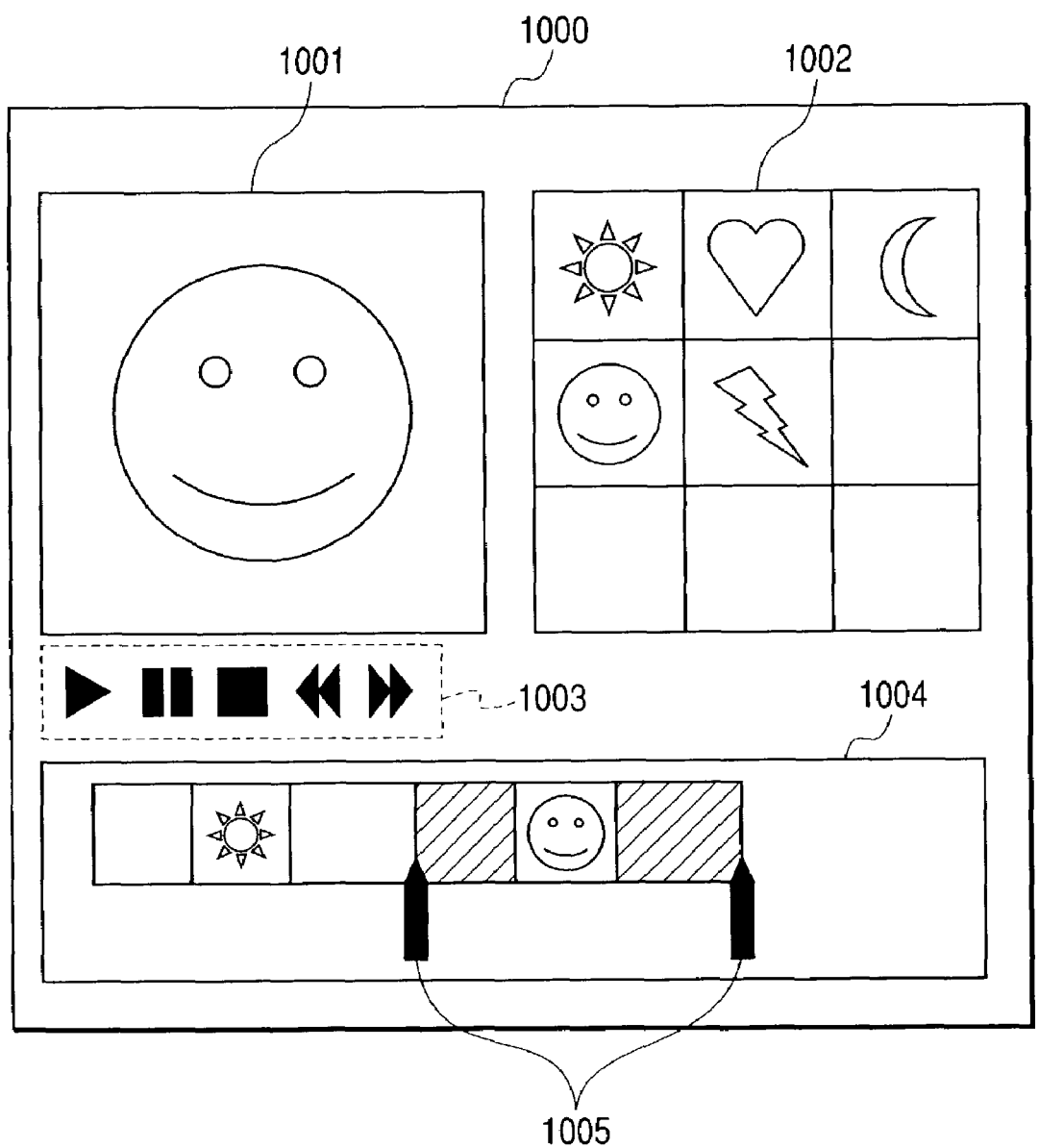
FIG. 10 is a view showing a display image in an editing operation.

Then, in a step S902, the user operates a UI (user interface) consisting of the display unit 502 and the user operation unit 504 shown in FIG. 10 thereby designating a clip.

Then the user designates a scene by similarly operating the UI shown in FIG. 10 (step S903). The details of such clip designating process and scene designating process will be explained later. A scene means a section which the user wishes to use in the moving image to be edited and constitutes a minimum unit in the editing. The information on the scene under editing is generated as scene information exemplified in FIG. 11. The scene information shown in FIG. 11 designates the IDs of the selected clips and the start and end points of the selected section in each clip by frame IDs. The scenes are arranged in their order on a table. Therefore the order of reproduction as the result of editing is from the start of the table.

Then, in a step S904, the reading unit 501 read the camera operation information corresponding to the scene designated as explained in the foregoing.

Then, in a step S905, the scene rule collating unit 503 executes collation of the camera operation information corresponding to the scene with a scene rule 505. The scene rule 505 means a rule relating to the connection of the scenes for obtaining an image effect in the moving image editing. A violation of such rule may result in an image giving uneasy feeling or a monotonous image without stimulation.

For example, the present embodiment employs the scene rules such as:

(1) in a scene ending with a panning and a scene starting with a panning, the directions of both panning operations should be same (otherwise the images will provide uneasy feeling); and (2) in a scene ending with a tilting and a scene starting with a tilting, the directions of both tilting operations should be same (otherwise the images will provide uneasy feeling). The details of collating method will be explained later.

Then, in a step S906, the scene rule collating unit 503 discriminates whether the scene information violates the scene rule, and, in case of violation, the sequence proceeds to a step S907 to give a warning to the user, but, in case of no violation, the step S907 is skipped. A step S907 displays a message shown in FIG. 12 on the display unit 502 thereby giving a warning to the user. Based on such warning, the user may execute a change to another scene (step S908) or a change to another clip (step S909). The user also can execute the editing operation disregarding the warning.

The above-described operations are executed until all the necessary scenes are designated and until the final scene information is completed. In case of applying plural rules, such rules are applied according to the priority thereof. Then, in confirming the result of editing, the scenes are reproduced in succession according to the final scene information.

In the following, there will be given a detailed explanation on the method of designating scenes by the user.

FIG. 10 shows an example of the UI displayed on the display device 407 at the editing process.

An editing operation window 1000 provides an area for the editing operation. A reproduction window 1001 provides an area for reproducing, for the purpose of confirmation, an image of the selected clip or according to the result of editing. A clip window 1002 is an area for a list display of thumbnail images of the clips recorded on the storage medium 120.

Buttons 1003 are used for manipulating the image reproduced in the reproduction window 1001 and the buttons from the left to the right respectively instruct operations of "reproduction", "pause", "stop", "rewinding" and "fast forward". A scene designating window 1004 provides an area for arraying the selected clips and designating sections to be selected. The clips are displayed by superposed thumbnail images for facilitating recognition by the user. A scene designating bar 1005 can be manipulated by the user, and the manipulation of the scene designating bar 1005 allows to designate the start point and the end point of a selected clip (hatched area).

In the editing operation with such UI, the user selects the clips from the clip window 1002 and sets such clips in the scene designating window 1004 by drag-and-drop operations in the desired order of reproduction, and the start and end points are designated in the scene designating bar 1005. In this operation, the user can confirm the image at any desired time by operating the buttons 1003 and reproducing the image in the reproduction window 1003.

In the following there will be given a detailed explanation on the collating method of the camera operation information corresponding to the scene with the scene rule.

Figure 13:
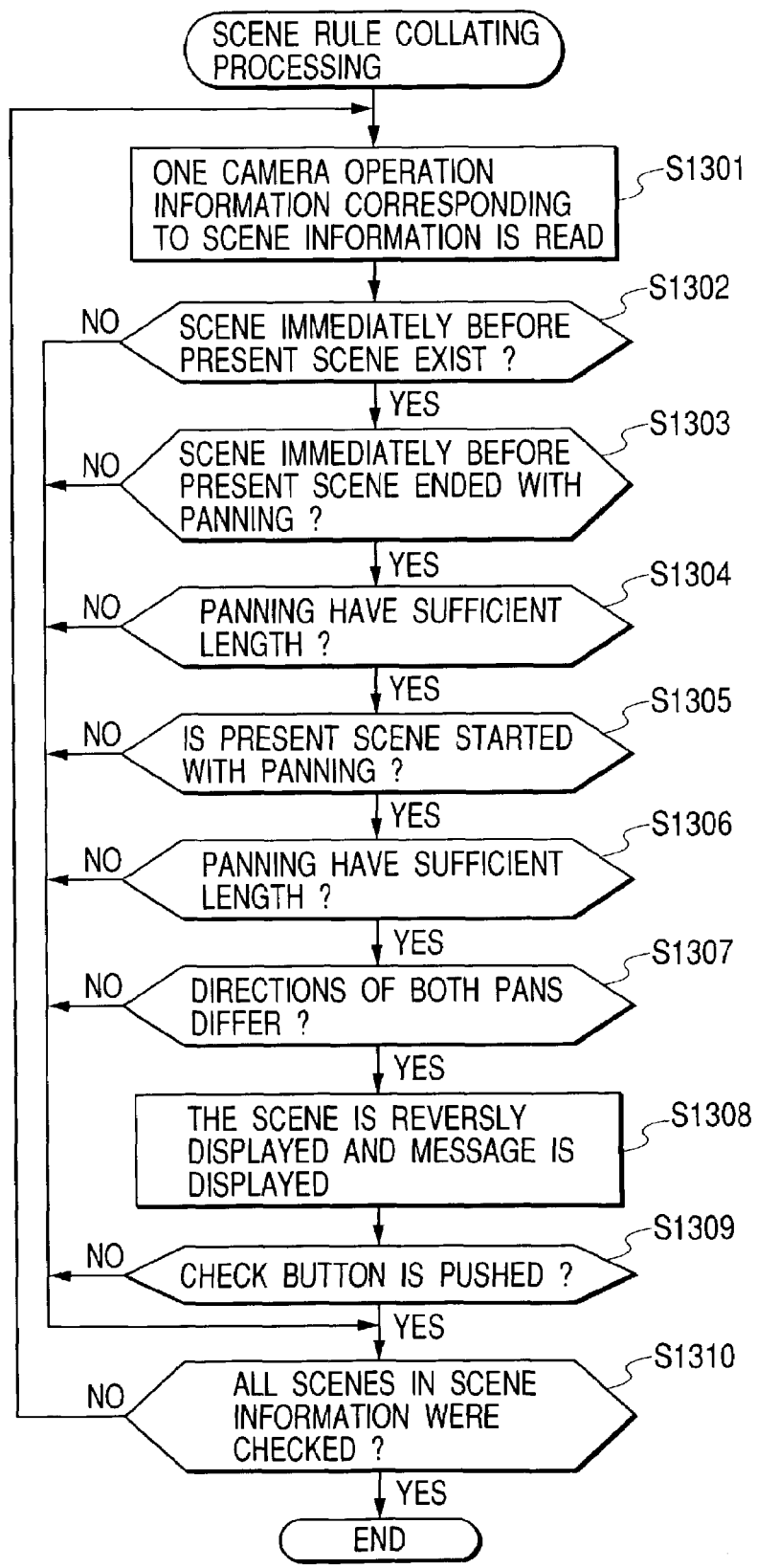
FIG. 13 is a flow chart showing the collating process for the scene rule.

FIG. 13 is a flow chart showing the details of the scene rule collating process of the steps S904 to S907 in FIG. 9. For the purpose of simplicity, there is only shown a procedure relating to the aforementioned rule (1).

In a step S1301, the reading unit 501 reads, from the storage medium 120, the scenes present in the scene information and the corresponding camera operation information. In an example shown in FIG. 11, there is at first read a leading scene, and there are also read camera operation information (panning in this case) present in the frame ID=1 to 300 of the clip ID=1. Then there is retained, in a memory in the editorial unit 130, the information indicating the section within the scene, where the panning exits. This information is retained until the serial process is terminated.

Then, a step S1302 discriminates when an immediately preceding scene exists. The immediately preceding scene means, in the scene information, a scene immediately before the scene under current reading. The result of discrimination is therefore always "NO" in case of the first scene.

Then, a step S1303 discriminates whether the immediately preceding scene ends with a panning. The discrimination is made by acquiring, from the memory, the operation information of the last frame of the immediately preceding scene. If such scene ends with a panning, the sequence proceeds to a step S1304 to discriminate whether the length of the panning operation in the last portion of the immediately preceding scene is at least equal to a predetermined length. This discrimination means that the rule (1) is not applied if the panning is very short and is of a level not much noticeable to the human eyes. Such length can be experimentally determined and is not particularly limited, but is desirably about 10 frames. Thus, there is checked the scene information of the last 10 frames in the immediately preceding scene.

If the step S1304 identifies that the panning is at least equal to the predetermined length, the sequence proceeds to a step S1305 for discriminating whether the scene under current processing starts with a panning operation. Such discrimination can be achieved from the camera operation information already read in the step S1301.

If the step S1305 identifies that the scene under current processing starts with a panning, the sequence proceeds to a step S1306 for discriminating whether the length of the panning operation is at least equal to a predetermined length. This discrimination is made for the same reason as in the step S1304.

Figure 14:
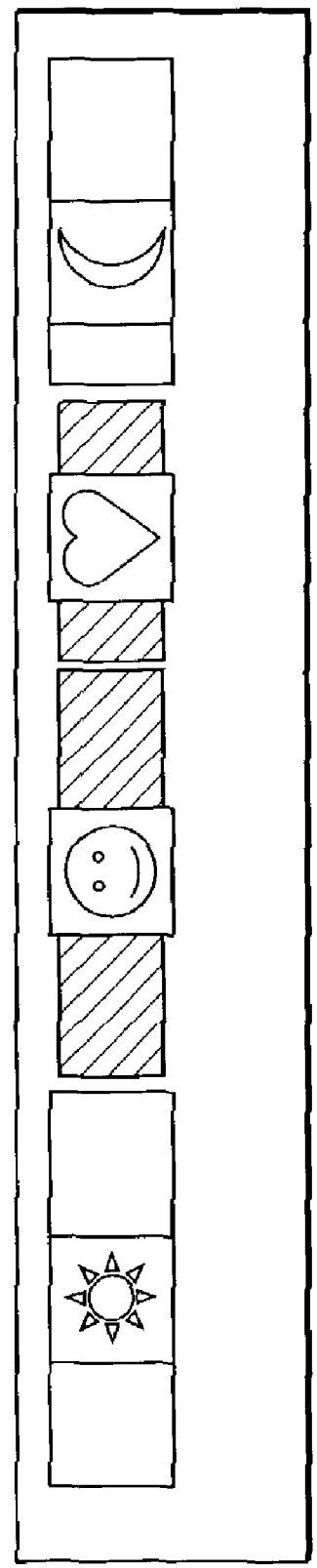
FIG. 14 is a view showing a window display according to a result of collation with the scene rule.

If the step S1306 identifies that the length of the panning is at least equal to a predetermined value, the sequence proceeds to a step S1307 for discriminating whether the former and latter panning operations are in different directions. More specifically, the rule (1) is violated if the panning operation at the end of the immediately preceding scene is from right to left while the panning operation in the current scene is from left to right. In such case, therefore, the sequence proceeds to a step S1308 for reversal display of the corresponding scene on the scene designating window 1004 as shown in FIG. 14 and also displaying the message window shown in FIG. 12.

Then, a step S1309 discriminates whether a confirmation button in the message window has been depressed. If depressed, the sequence proceeds to a next step S1310. Also in case any of the conditions of the steps S1302 to S1306 is not met, the sequence proceeds to a step S1310.

A step S1310 is an end discrimination for confirming whether all the scenes in the scene information have been checked, and, if not, the sequence returns to the step S1301 to repeat the sequence of the steps S1301 to S1309.

The scene information obtained as a result of such editing operation is stored in a memory in the moving image editing unit 130, for example the ROM 403 or the external storage apparatus 406 shown in FIG. 4. It is also possible to provide the moving image editorial unit 130 with a recording circuit for data recording on the storage medium 120 and to record the completed scene information on the storage medium 120.

In the editing process of the present embodiment, as explained in the foregoing, the state between the scenes is judged by the camera operation information recorded together with the image data at the photographing thereof, and warning information is displayed in case such state is inadequate as the result of editing.

Therefore, if camera operation is considered inadequate before and after the switching of scenes after the editing operation, the user can easily recognize such inadequate state and such process constitutes a powerful aid for the editing operation.

Second Embodiment

In the first embodiment, the camera operation information relating to the image data is acquired from the camera operation unit 203 and the sensor unit 204 of the photography unit 110 at the photographing of the image data, but there can be conceived a situation where no means is available for obtaining the camera operation information at the photographing operation. An example of the realizing method in such situation will be explained as a second embodiment.

More specifically, in the configuration of the the first embodiment, the photography unit 110 is composed of a video camera for recording image data in a disk medium, and the image editorial unit 130 is provided with a PC (and a moving image editing application) having a drive for reading the recording information to the aforementioned disk. On the other hand, in the configuration of the present embodiment, the image editorial unit 130 is composed solely of a PC and an application on such PC, while the means for entering the image data is composed for example of an IEEE 1394 serial bus interface, to which a video camera or the like is connected for inputting the image data.

Figure 15:
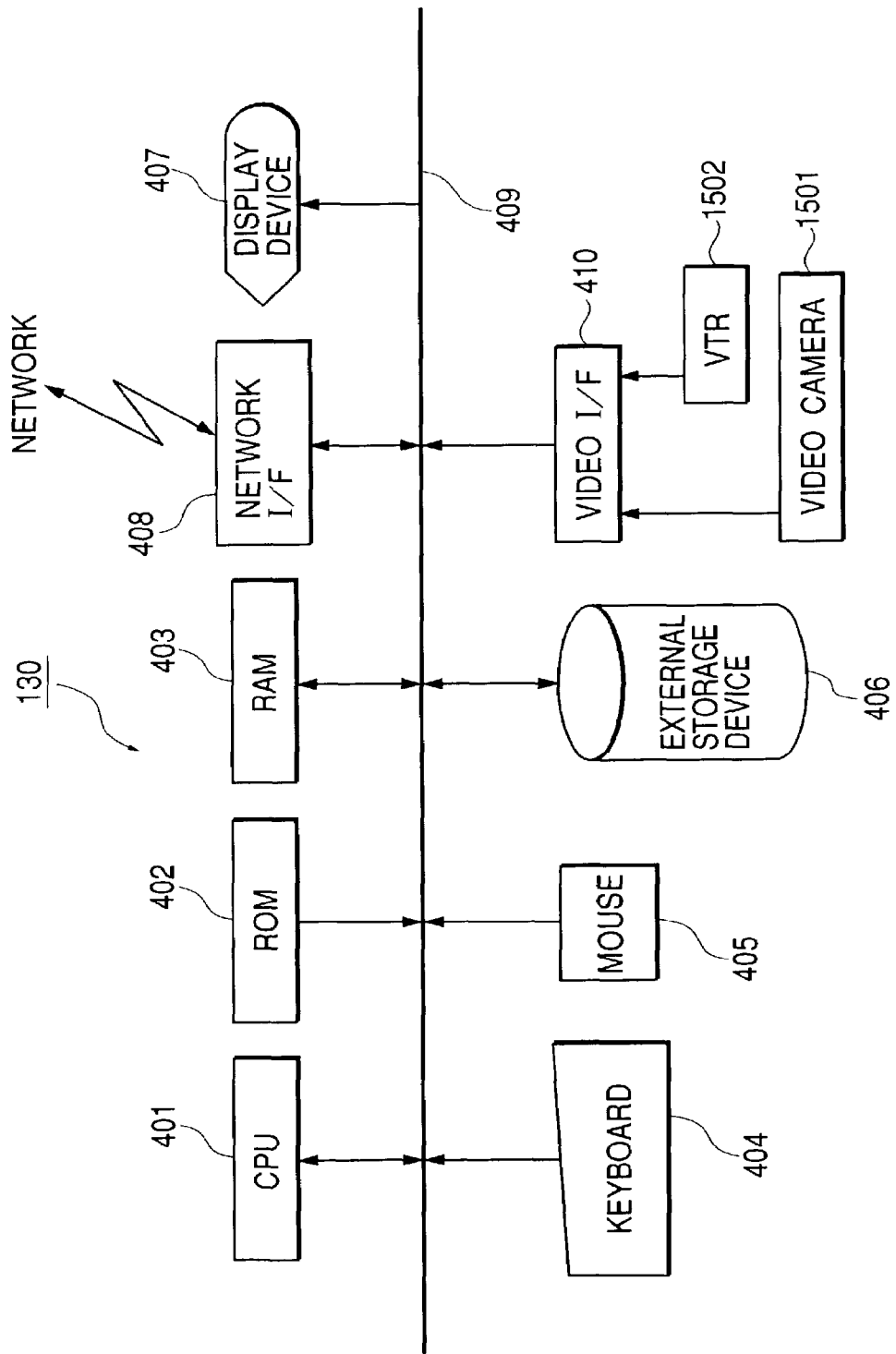
FIG. 15 is a view showing another configuration of the moving image editing unit.

Thus, in the present embodiment, the image editorial unit 130 is provided as shown in FIG. 15 with a video I/F 410 for enabling entry of the image data, obtained by the video camera 1501 or the VCR 1502, in the form of digital data.

It is also possible to provide the video camera 1501, the VCR 1502 and the external storage apparatus 406 on a network and to execute the data exchange by communication through the network I/F.

Figure 16:
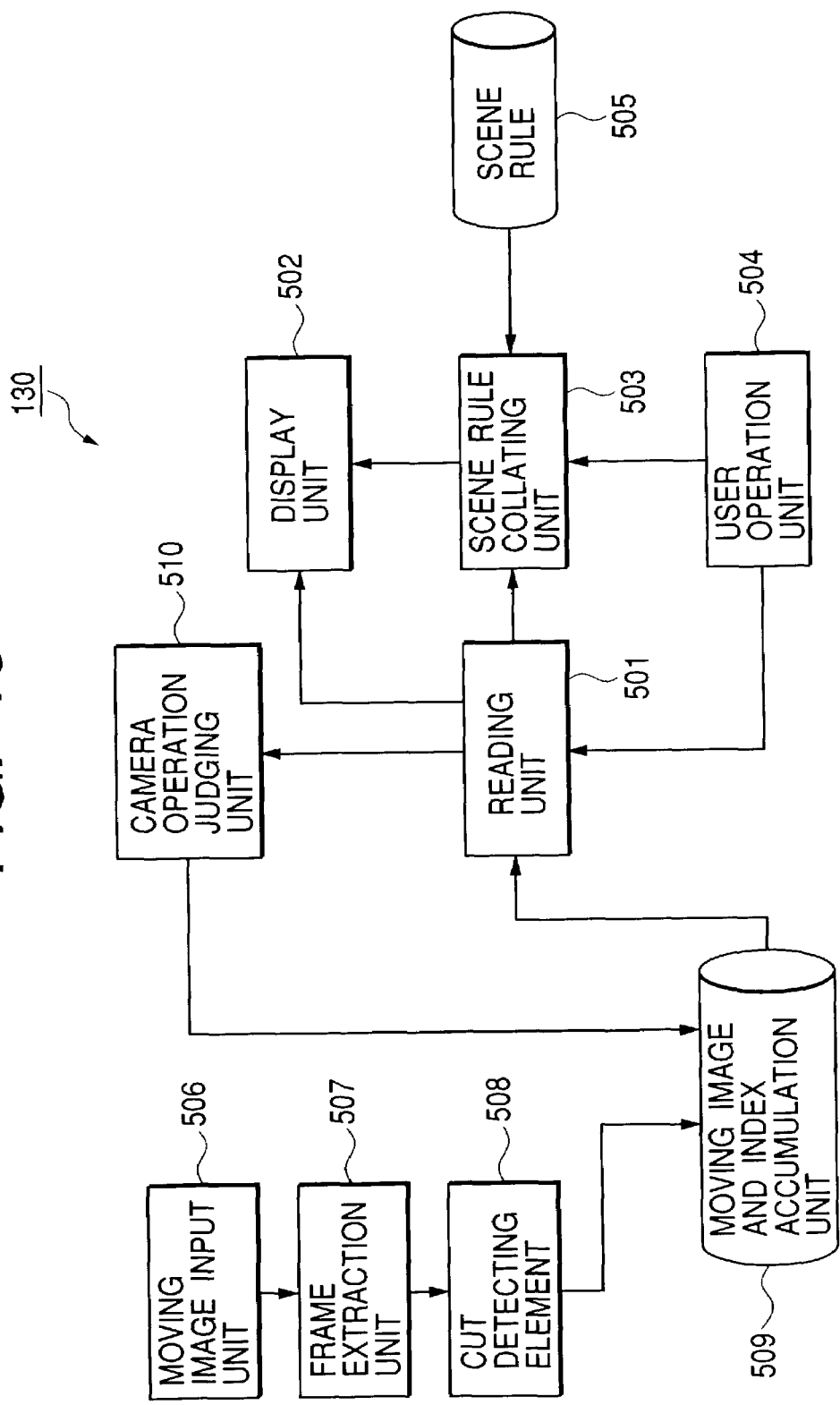
FIG. 16 is another functional block diagram of the moving image editing unit.

FIG. 16 is a functional block diagram of the moving image editorial unit 130 of the present embodiment.

The moving image editorial unit 130 of the present embodiment is provided, in addition to the configuration shown in FIG. 4, with a moving image input unit 506, a frame extraction unit 507, a cut detection unit 508, a moving image/index accumulation unit 509 and a camera operation judging unit 510.

The moving image input unit 506 enters the moving image data, outputted from the video camera 1501 or the VCR 1502 into the moving image editorial unit 130 through the video I/F 410. The frame extraction unit 507 extracts in succession the frames constituting the image data fetched by the moving image input unit 506. The cut detection unit 508 detects a cut point in the image, based on the frame image extracted by the frame extraction unit 507. The moving image/index accumulation unit 509 can be composed of a storage apparatus such as the external storage apparatus 406, and accumulates the frame image extracted by the frame extraction unit 507 and the camera operation information to be explained later.

The reading unit 501 reads data of an arbitrary position from the moving image/index accumulation unit 509. The camera operation judging unit 510 applies an image processing on the image data read by the reading unit 501, and judges the camera operation information from the data after such processing.

The display unit 152 displays, as in the first embodiment, the state of editing of the object image and the result of such editing to the user. The scene rule collating unit 503 displays, as in the first embodiment, a warning in the aforementioned manner based on the collation of the scene rule stored in the scene rule storage unit 505 with the camera operation information obtained in the camera operation judging unit 510. The user operation unit 504 accepts, as in the first embodiment, operations of the user necessary for the image editing, such as the designation of a scene section.

Figure 17:
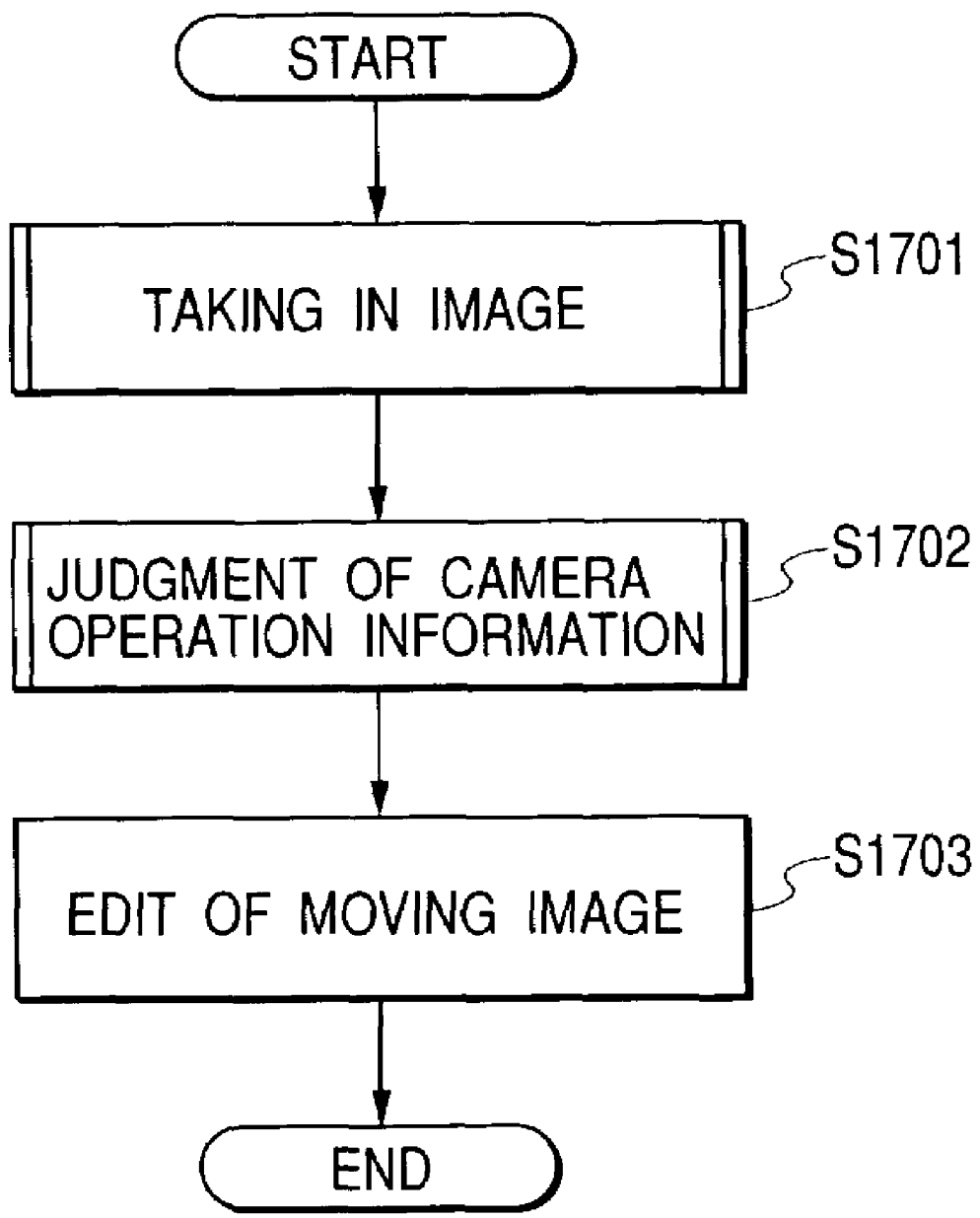
FIG. 17 is a flow chart showing the functions of the moving image editing unit.

FIG. 17 is a flow chart showing the function of the entire moving image editorial unit 130 of the present embodiment.

In a step S1701, the moving image input unit 506 fetches the image data. The frame extraction unit 507 extracts in succession the frame images constituting the image data fetched by the moving image input unit 506. The cut detection unit 508 detects the cut point in the frame image, extracted by the frame extraction unit 507. The moving image/index accumulation unit 509 accumulates the frame image extracted by the frame extraction unit 507.

In a step S1702, the reading unit 501 reads the image data to be subjected to editing, from the moving image/index accumulation unit 509. The camera operation judging unit 510 applies the image processing on the object image data obtained by the reading unit 501 thereby judging the camera operation relating to the object image data, and accumulates the information of the result of judgment (camera operation information) in the moving image/index accumulation unit 509.

In a step S1703, the reading unit 501, display unit 502, scene rule collating unit 503, user operation unit 504 and scene rule storage unit 505 execute the editing process for the object image data in a similar manner as in the first embodiment.

Figure 18:
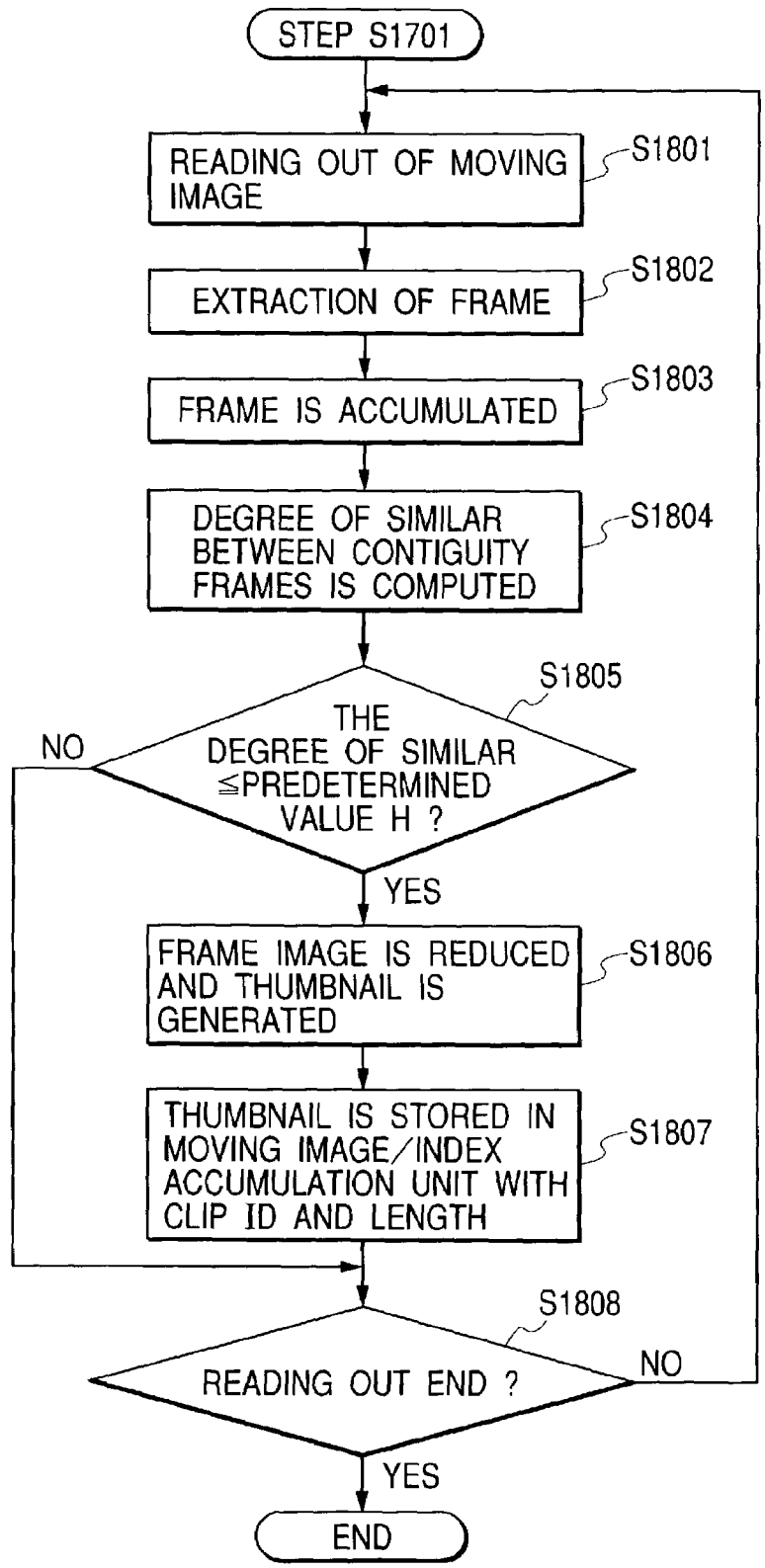
FIG. 18 is a flow chart showing a moving image reading process in FIG. 17.

In the following there will be explained the moving image fetching process of the step S1701, of which flow chart is shown in FIG. 18.

In a step S1801, the moving image input unit 506 receives, through the video I/F 410, the moving image data outputted from the video camera 1501 or the VCR 1502, and fetches such data into the moving image editorial unit 130. The moving image input unit 506 can receive the image data not only from the video camera 1501 or the VCR 1502 but also from other apparatus or through a transmission channel.

Then, in a step S1802, the frame extraction unit 507 extracts in succession the image data of the plural frames constituting the image data fetched by the moving image input unit 506, and supplies the cut detection unit 508 with such plural frames.

The cut detection unit 508 attaches a frame ID to each of the frame images extracted by the frame extraction unit 507, and accumulates the frame image after the frame ID attachment in the moving image/index accumulation unit 509 (step S1803). The frame ID mentioned above is a number starting from 1 and increasing for each clip.

Then the cut detection unit 508 detects the similarity between the adjacent frames, in the frame images accumulated in the moving image/index accumulation unit 509 (step S1804).

Figures 19, 20:
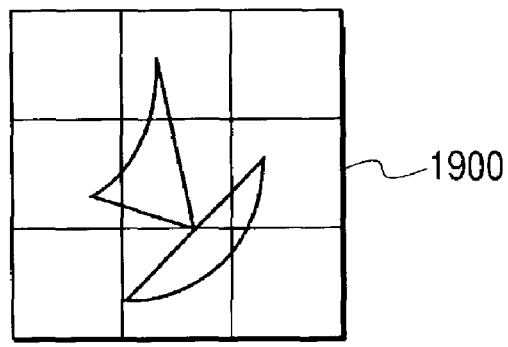
FIG. 19 is a view showing a process for calculating similarity.
FIG. 20 is a view showing the content of cut information.

There will be explained an example of the method for detecting the similarity between the adjacent frames. At first the similarity distance is calculated between the adjacent frames, and similarity is represented by percentage, taking 100% for completely identical images. The algorithm for calculating the similarity distance between the frames is not particularly limited, but, in an example, the interframe similarity distance can be calculated by dividing each of the frames (two adjacent frames) 1900 to be compared into plural blocks in the vertical and horizontal directions as shown in FIG. 19, calculating the average value of each of the RGB color component data in each block, and calculating the squared sum of the differences of the RGB data respectively corresponding blocks to be compared. As the interframe similarity distance becomes smaller, the two frames show stronger similarity, but, as it becomes larger, the two frames become less similar and have stronger possibility of constituting a cut point.

The interframe similarity distance is represented by the following formula (1):

$$\sum_{i=1}^{k} \{(P1_{iR} - P2_{iR})^2 + (P1_{iG} - P2_{iG})^2 + (P1_{iB} - P2_{iB})^2\} \quad (1)$$

wherein:
k: number of divided blocks;
$P1_{iR}$: average value of R channel in an i-th block of an immediately preceding block;
$P1_{iG}$: average value of G channel in an i-th block of an immediately preceding block;
$P1_{iB}$: average value of B channel in an i-th block of an immediately preceding block;
$P2_{iR}$: average value of R channel in an i-th block of the current block;
$P2_{iG}$: average value of G channel in an i-th block of the current block; and
$P2_{iB}$: average value of B channel in an i-th block of the current block.

Such similarity distance is converted into the similarity and is used.

The cut detection unit 508 discriminates whether the similarity between the adjacent frames, determined in the step S1804 is not higher than a predetermined value H (step S1805).

This discrimination is to detect a changing point, or a cut point, of the scenes. Since the content of image changes suddenly at such cut point, the similarity between the frames before and after becomes lower. Thus, the predetermined value H is the lower limit value of the similarity not regarded as a cut point. The predetermined value H can be determined experimentally and is not particularly limited, but is desirably about 80%.

The sequence proceeds to a step S1806 if the similarity between the adjacent frames is not higher than the predetermined value H, but to a step S1808 if the similarity is higher than the predetermined value H.

In case the discrimination of the step S1805 identifies that the similarity between the adjacent frames is not higher than the predetermined value H, the cut detection unit 508 recognizes the frame image under current processing constitutes a cut point, and, for selecting such frame image as an index, generates a thumbnail image by reducing such frame image (step S1806).

Then, utilizing the thumbnail image generated in the step S1806, the cut detection unit 508 accumulates, in the moving image/index accumulation unit 509, cut point information which consists of a clip ID sequentially given from the first clip, a clip length (number of frames) and a thumbnail image as shown in FIG. 20 (step S1807). Then a step S1808 discriminates whether the reading process on the image data to be processed has been completed, and, if not completed, the sequence from the step S1801 is repeated again, but the present sequence is terminated when the reading process is completed.

Figure 21:
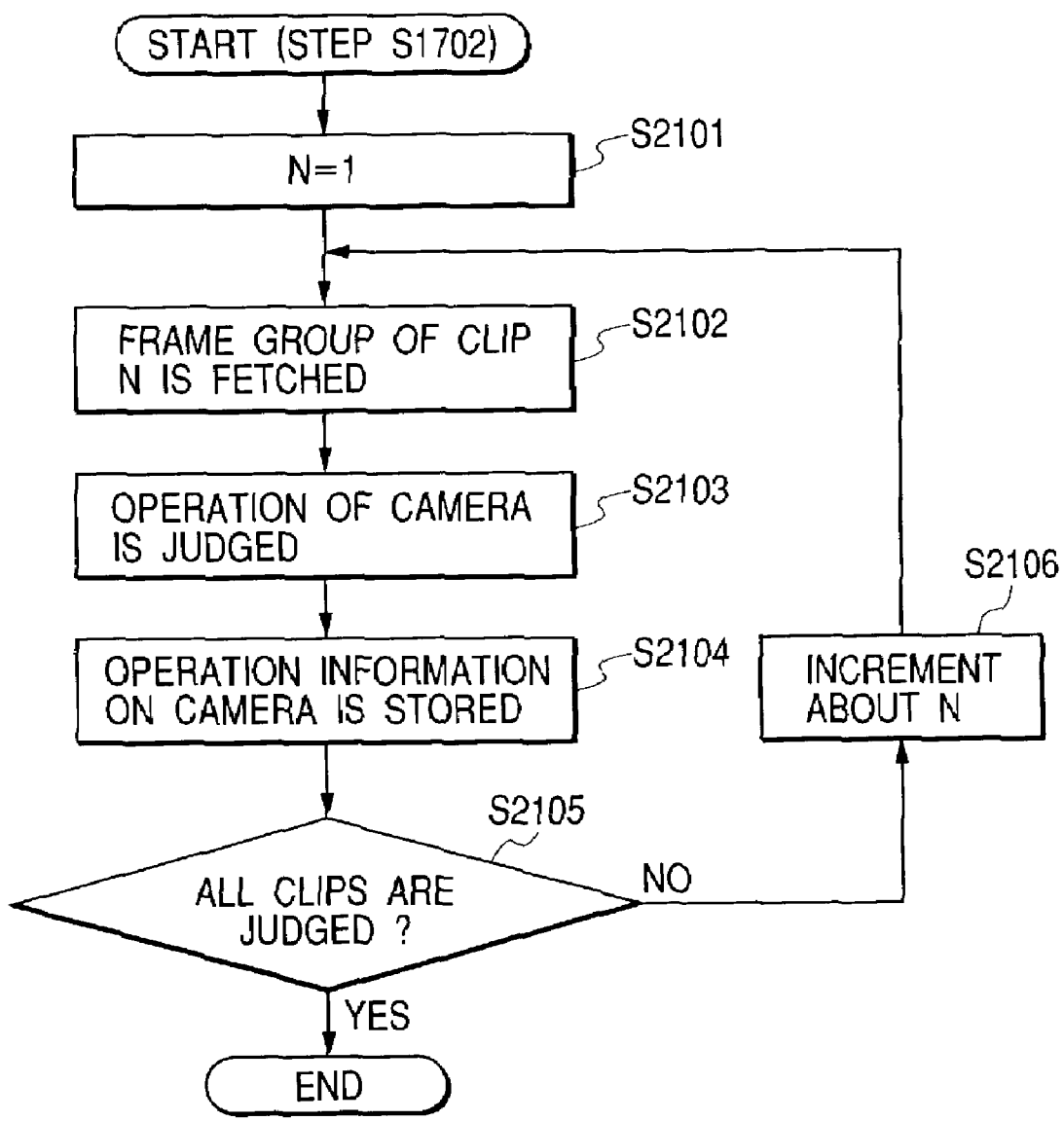
FIG. 21 is a flow chart showing a discrimination process for the camera operation information in FIG. 17.

In the following there will be explained the judging process for the camera operation information in the step S1702 in FIG. 17. FIG. 21 shows a flow chart of this camera operation information judging process.

At first, the reading unit 501 sets an initial value 1 for the index N, indicating the clip to be processed (step S2101). Then the reading unit 501 obtains, from the moving image/index accumulation unit 509, a group of frames corresponding to a clip having an index N (step S2102).

The camera operation judging unit 510 judges the camera operation from the data of the frame group read by the reading unit 501. Such judgment can be achieved, for example, by a method of determining vanishing points of motion vectors by Huffman transformation, then selecting, among plural vanishing points, a vanishing point having a largest number of votes as the vanishing point for the background and solving conditional equations for the camera operation. The relationship between the camera operation and the vanishing point and the method for determining the camera operation are detailedly explained, for example, by Ken-ichi Kanaya, "Gazou Rikai (Image Understanding)", Morikita Press.

The camera operation judging unit 510 correlates the result of judgment of the camera operation obtained in the step S2102, as the camera operation information of the format as shown in FIG. 7 or 8, with the corresponding frame ID, and accumulates such information, in the footer area of the file, in the moving image/index accumulation unit 509 (step S2104).

Then there is discriminated whether an unprocessed clip is still present (step S2105), and, if present, an increment of the index N is executed (step S2106) and the process from the step S2101 is executed. The present sequence is terminated when all the clips are processed.

In the present embodiment, the moving image editing process of the step S1703 shown in FIG. 17 will not be explained further as it is similar to the moving image editing process in the foregoing first embodiment.

In the present embodiment, as explained in the foregoing, even if the camera operation information at the photographing operation is not associated with the image data to be edited, such camera operation information is estimated from the moving image data. Also the camera operation information between the scenes to be edited is collated with the scene rule and a warning is issued in case such scene rule is violated, so that, even in case of editing image data not associated with the camera operation information, the user can easily recognize any camera operation that is considered inadequate at the switching of scenes, and can therefore obtain satisfactory edited image.

Third Embodiment

In the following there will be explained a third embodiment of the present invention.

In the foregoing first embodiment, an alarm is displayed in case the camera operation information between the two scenes designated by the user violates the scene rule, but, in the present embodiment, a transition effect is automatically added between the two scenes in case the scene rule is violated.

In the present embodiment, the moving image editing system and the apparatus therein are same as those shown in FIGS. 1 to 8. Also in the present embodiment, the editing process is executed by the moving image editorial unit 130, utilizing the editing image shown in FIG. 10.

Figure 22:
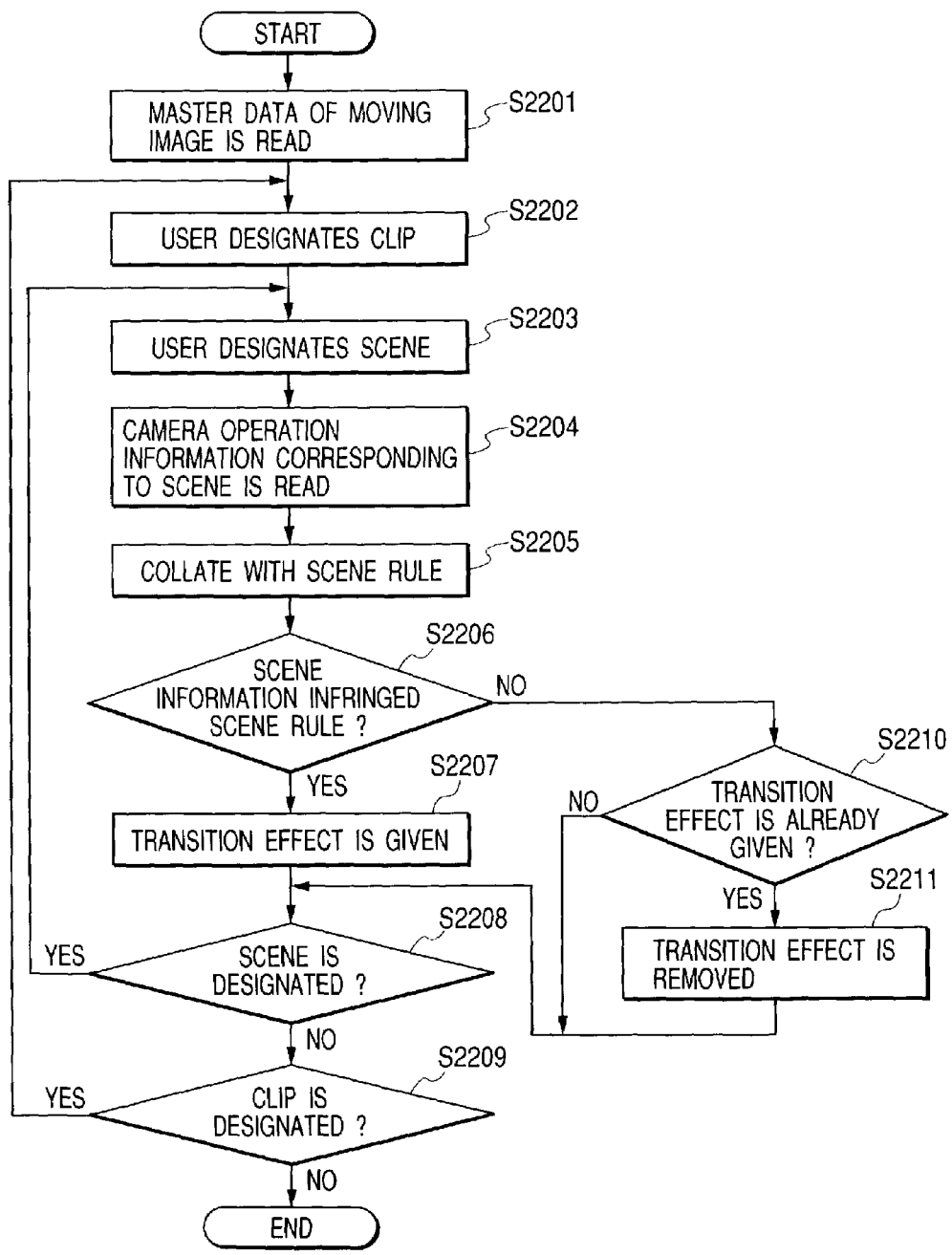
FIG. 22 is a flow chart showing the functions of a moving image editorial unit.

In the following the function of the moving image editorial unit 130 in the present embodiment will be explained, with reference to FIG. 22 showing the flow chart of the process of the moving image editorial unit 130.

At first, the reading unit 510 shown in FIG. 5 reads the base data of the moving image data to be processed, from the storage medium 120 (step S2201). Also in the present embodiment, the storage medium 120 stores the image data obtained in the photographing unit 110, as a file for each clip. Also the base data include an ID indicating the file of the object image data, information indicating the length of such file, and thumbnail image data at the start of the object image data, and are used for display on the UI.

The display unit 502 displays the operation image 1000 shown in FIG. 10. Utilizing the editing image shown in FIG. 10 and the user operation unit 504, the user designates the desired clip and scene as explained in the foregoing (steps S2202, S2203).

Then the reading unit 501 acquires, from the multiplexed data read in the step S2201, the camera operation information corresponding to the scene designated by the user in the steps S2202 and S2203 (step S2204).

The scene rule collating unit 503 collates the camera operation information corresponding to the scene information with the information of the scene rule stored in the scene rule storage unit 505 (step S2205). Then the scene rule collating unit 503 discriminates, based on the result of collation in the step S2205, whether the camera operation information corresponding to the scene information violates the scene rule of the scene rule storage unit 505 (step S2206).

Based on the result of the discrimination, the sequence proceeds to a step S2207 or S2210 respectively in case the scene rule is violated or not.

In case the discrimination of the step S2206 identifies that the scene information violates the scene rule, the scene rule collating unit 503 provides a transition effect to the junction of the scene to be edited (section of editing desired by the user within the image to be edited) indicated by such scene information, thereby hiding unpleasant impression of the junction of the scenes (step S2207). The transition effect includes, for example, wiping, fade-in/out, dissolving etc.

Thereafter the sequence proceeds to a step S2208.

On the other hand, in case the discrimination of the step S2206 identifies that the scene information does not violate the scene rule, the scene rule collating unit 503 discriminates whether the transition effect has already been provided to the object scene to be edited, indicated by such scene information (step S2210). If such discrimination identifies that the transition effect has already been provided, there is executed a next step S2211, but, if not provided, the sequence proceeds to a step S2208.

The discrimination of the step S2210 identifies that the transition effect has already been provided to the object scene to be processed indicated by the scene information, the scene rule collating unit 503 executes a process of eliminating such transition effect (step S2211). This corresponds to a situation where, in the proceeding of the editing operation by the user, a scene which previously violated the scene rule no longer violates the scene rule.

The sequence thereafter proceeds to a next step S2208.

Then the user designates a next scene or another clip in order to continue the editing operation, utilizing the UI shown in FIG. 10. The user operation unit 504 discriminates whether a next scene has been designated (step S2208) or another clip has been designated (step S2209) by the user. As a result of such discrimination, if a scene has been designated, the sequence returns to the step S2203, but, if another clip has been designated, the sequence returns to the step S2202.

In this manner, the moving image editorial unit 130 executes the procedure of the steps S2201 to S2209 until all the necessary scenes are designated by the user and the final scene information is completed. The image as the result of editing is to be reproduced according to such final scene information.

In case the moving image editing unit 130 applies plural scene rules, there may be applied a suitable scene rule based on the order of priority given in advance to these scene rules.

Figure 23:
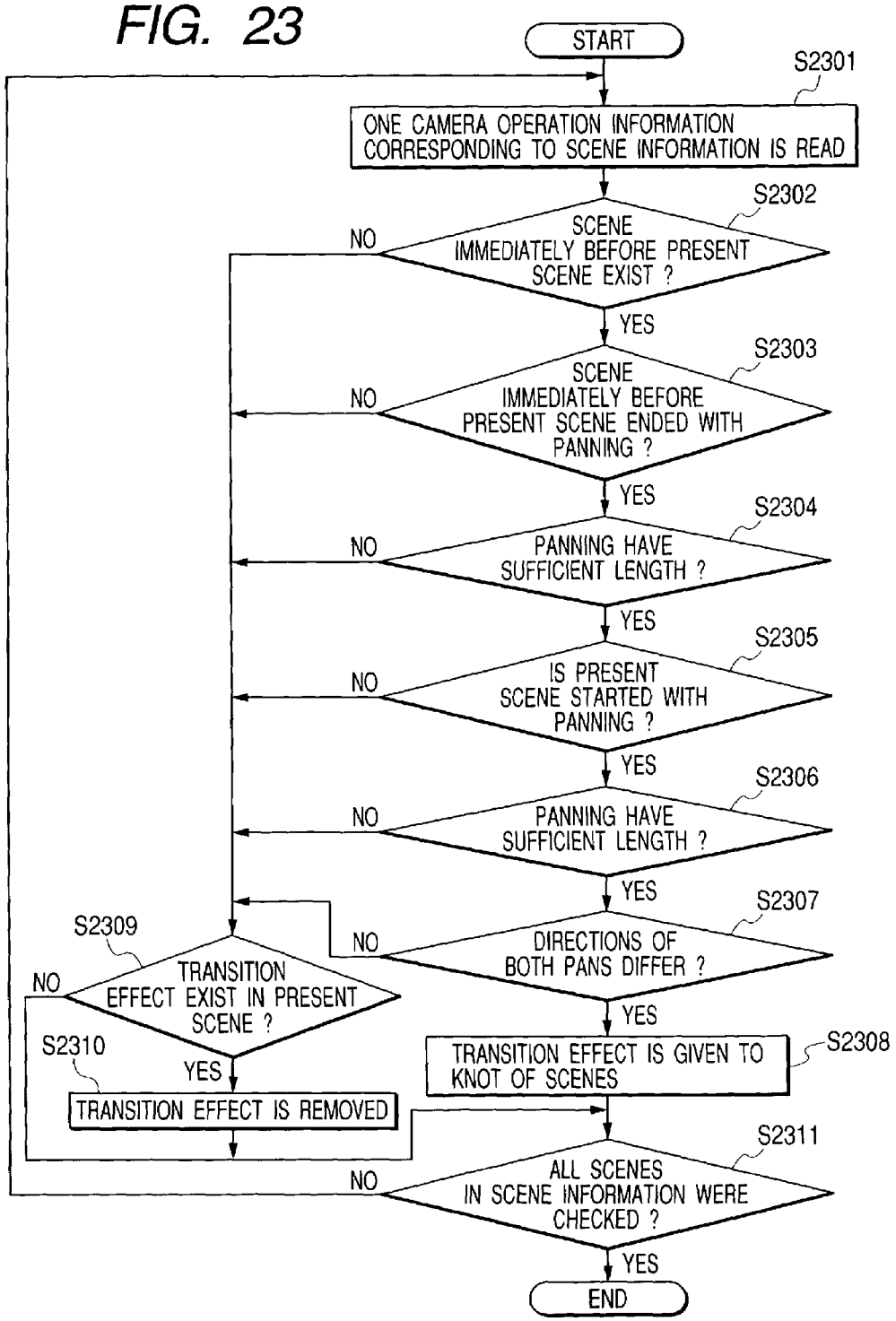
FIG. 23 is a flow chart showing a transition effect providing process.

In the following there will be explained the collating process of the camera operation information and the scene rule to be executed by the scene rule collating unit 503 in the steps S2205 and S2206 shown in FIG. 22. FIG. 23 is a flow chart showing the details of the steps S2205 and S2206. For the purpose of simplicity, the aforementioned rule (1) is shows as the scene rule, but such example is not restrictive. The process of each step in FIG. 23 is executed in succession to all the scenes indicated by the clip IDs contained in the scene information.

At first, the scene rule collating unit 503 acquires the object scene in the scene information and the corresponding camera operation information (step S2301). For example, in the scene information shown in FIG. 11, if the initial scene with clip ID=1 is the object scene, there is read the camera operation information present within a range from the frame ID=1 constituting the starting point of the clip to the frame ID=300 constituting the end point of the clip. The camera operation information in this case is assumed as panning information. Then, in the scene with the frame IDs=1 to 300, frames containing the panning information as the camera operation information are retained in an unrepresented internal memory. The retained information is retained until the end of the sequence of the process.

Then, a step S2302 discriminates whether a scene immediately preceding the object scene is present. Based on the result of such discrimination, the sequence proceeds to a next step S2302 or a step S2309 respectively if an immediately preceding scene is present or not.

In case the discrimination of the step S2302 identifies that a scene is present immediately preceding the object scene, there is discriminated whether such scene ends with a panning (step S2303). Based on the result of such discrimination, the sequence proceeds to a next S2304 or a step s2309 respectively if the immediately preceding scene ends with a panning or not.

In case the discrimination of the step S2303 identifies that the scene immediately preceding the object scene ends with a panning, there is discriminated whether the duration of such panning is at least equal to a predetermined length (step S2304). Based on the result of such discrimination, the sequence proceeds to a next S2305 or a step S2309 respectively if the immediately preceding scene ends with a panning of a predetermined length or not.

In case the discrimination of the step S2304 identifies that the immediately preceding scene ends with a panning of a predetermined length, there is discriminated whether the object scene starts with a panning (step S2305). Based on the result of such discrimination, the sequence proceeds to a next S2306 or a step S2309 respectively if the object scene starts with a panning or not.

In case the discrimination of the step S2305 identifies that the object scene starts with a panning, there is discriminated whether the duration of such panning is at least equal to a predetermined length (step S2306). Based on the result of such discrimination, the sequence proceeds to a next S2307 or a step S2309 respectively if the object scene starts with a panning of a predetermined length or not.

In case the discrimination of the step S2306 identifies that the object scene starts with a panning of a predetermined length, there is discriminated whether the former and latter pannings have different directions (step S2307).

Figures 24, 25:
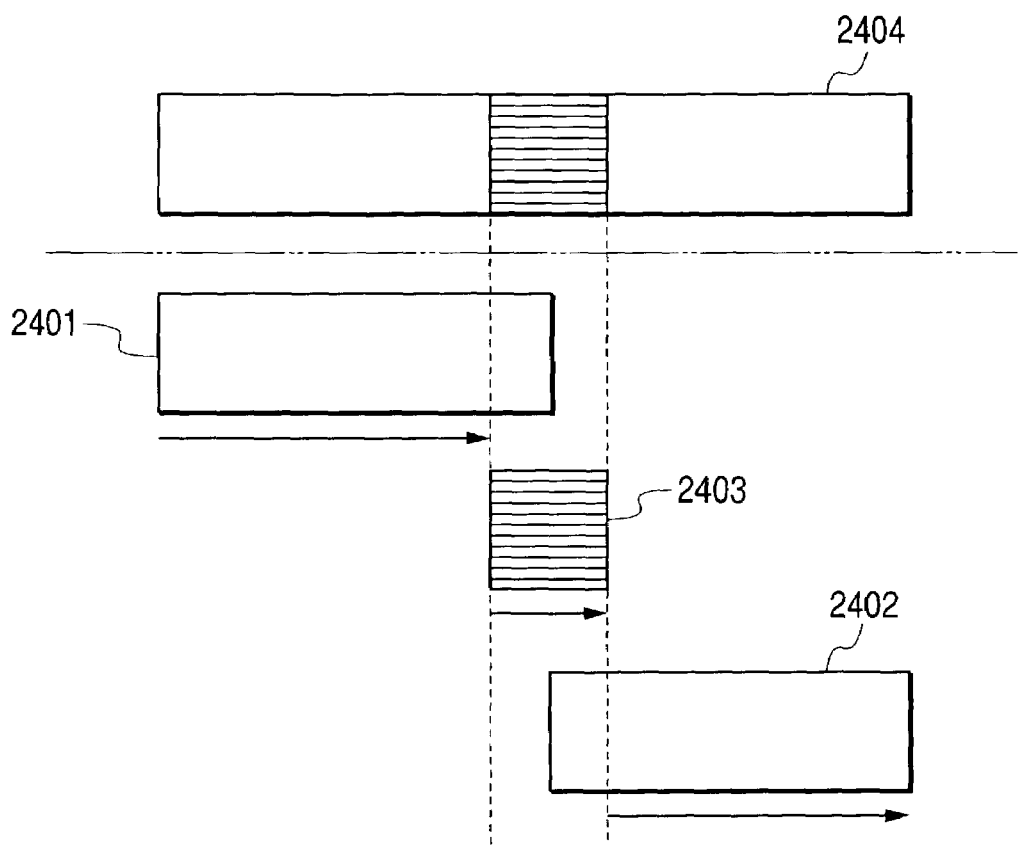
FIG. 24 is a view showing the content of the transition effect.
FIG. 25 is a view showing the content of scene information.

Based on the result of such discrimination, if the direction of the panning of the object scene is different from the direction of the panning of the immediately preceding scene, a transition effect 2403 of a predetermined length is provided at the junction of the object scene 2401 and the immediately preceding scene 2402 as shown in FIG. 24. In this manner the unpleasant portion becomes hidden and less conspicuous, whereby a satisfactory image can be obtained. Thereafter the sequence proceeds to a step S2311.

On the other hand, in case the result of any of the discriminations of the steps S2302 to S2307 is negative (NO), the scene rule is considered met and there is discriminated whether the object scene has already been given the transition effect in the prior editing process (step S2309). Based on the result of such discrimination, the sequence proceeds to a next step S2310 or a step S2311 respectively if the transition effect has already been provided or not.

In case the discrimination of the step S2309 identifies that the transition effect has already been provided to the object scene, such transition effect is eliminated from the object scene and the sequence proceeds to a next step S2311.

A step S2311 discriminates whether the process has been completed for all the scenes in the scene information, and, if any unprocessed scene still remains, the sequence returns to the step S2301 for executing the process for such scene. On the other hand, if the process has been completed for all the scenes, the present process is terminated.

In the following there will be explained a transition effect providing process to be executed by the scene rule collating unit 503.

As shown in FIG. 24, the transition effect 2403 is provided to the junction between the object scene 2402 and the immediately preceding scene 2401. The transition effect 2403 mentioned above has a predetermined length. Such predetermined length should enough for alleviating the unpleasant impression of the junction of the scenes and is not particularly limited, but is selected as a period of 60 frames in the present embodiment.

The transition effect 2403, the object scene 2402 and the immediately preceding scene 2401 are in a sequential relationship shown in FIG. 24 and are reproduced along a direction indicated by an arrow in FIG. 24. In the reproducing operation, therefore, the image appears with thus provided transition effect as indicated by 2404.

Figures 11, 12:
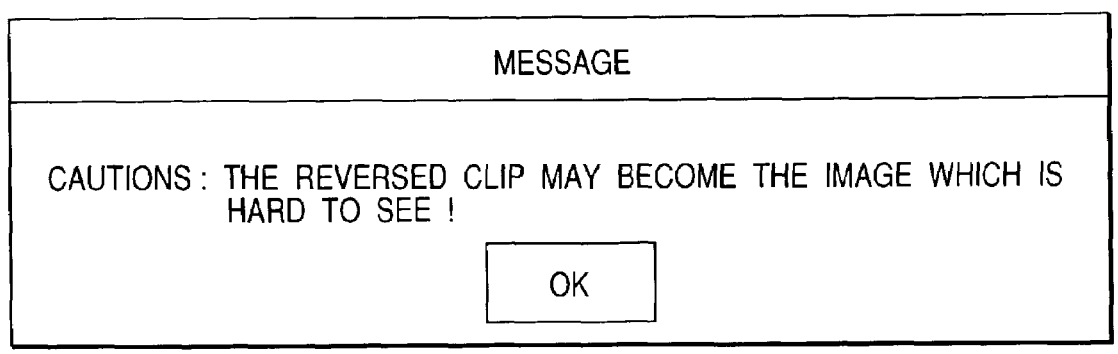
FIG. 11 is a view showing the content of scene information.
FIG. 12 is a view showing an alarm display in case the camera operation information violates the scene rule.

As an example, in the image data designated by the scene information shown in FIG. 11, if a scene indicated by the clip ID=2 is the object scene (third scene) while an immediately preceding scene is the scene indicated by the clip ID=4 (second scene) and a transition effect is provided between these scenes as indicated in FIG. 24, such scene information becomes as shown in FIG. 25.

In the scene information shown in FIG. 25, the data designated by clip ID=10000 are a clip of the transition effect. For the transition effect, there is given a special clip ID such as "10000". In this manner it is rendered possible to identify the clip ID indicating the transition effect.

Also, as will be apparent from the comparison of the scene information shown in FIG. 11 and that after the provision of the transition effect as shown in FIG. 25, a scene (clip ID=4) immediately preceding the object scene (clip ID=2) is shortened by 30 frames at the end point, while the object scene (clip ID=2) is shortened by 30 frames at the start point, and information representing the transition effect data (clip ID=10000) is inserted between these scenes.

The clip of the transition effect can be generated by rendering, utilizing the last 30 frames of the immediately preceding scene and the first 30 frames of the object scene.

On the other hand, in the transition effect eliminating process executed by the scene rule collating unit 503, there is executed a process inverse to the transition effect providing process explained above. By such process, the scene information is returned from the state shown in FIG. 25 to the state shown in FIG. 11.

The transition effect eliminating process is executed in case the transition effect has already been provided in a previous process. In the present embodiment, as a certain predetermined value is selected for the ID indicating the clip for the transition effect as shown in FIG. 25, it is easily possible to discriminate whether the transition effect has already been provided in the previous process by searching the ID of such predetermined value in the scene information.

In the editing process of the present embodiment, as explained in the foregoing, the state between the scenes is judged utilizing the camera operation information recorded together with the image data at the photographing thereof, and, if such state between the scenes violates a predetermined scene rule, such state is judged inadequate as the result of editing and the transition effect is automatically applied between the scenes.

Therefore, even in case of a camera operation which is considered inadequate before or after the switching of scenes after the editing, the unpleasant impression of the reproduced image can be alleviated and a satisfactory result of edition can be obtained even in the editing operation by the general user.

Fourth Embodiment

In the third embodiment, there is executed discrimination whether the camera operation information between the two scenes violates the scene rule, based on the camera operation information attached to the image data at the photographing operation, and the transition effect is automatically provided between the two scenes in case the scene rule is violated.

However, there may be a situation where means for obtaining the camera operation information is absent at the photographing operation.

In such situation, as already explained in the second embodiment, it is possible to estimate the camera operation information by the moving image editing unit 130 shown in FIG. 15 or 16, using the image data entered from the video camera 1501 or the VCR 1502 and to utilize such estimated camera operation information.

In such case, thus obtained camera operation information can be used to execute the process shown in FIGS. 22 and 23, thereby discriminating whether an inadequate camera operation has been executed before or after the switching of the scenes after the editing and automatically providing the transition effect, even in case the camera operation information is not attached to the image data.

In the foregoing embodiments, the photographing unit 110 and the moving image editorial unit 130 are separately constructed as shown in FIG. 1, but such configuration is not restrictive and they may be constructed as a single unit (or a single apparatus) for example by providing the photographing unit 110 with a sufficient calculating ability or providing the moving image editorial unit 130 with a photographing ability including a photographing lens etc.

Also the applicable scene rule is not limited to the foregoing rule (1) but can be various other rules such as a rule relating to the tilting of the camera.

Figures 26, 27:
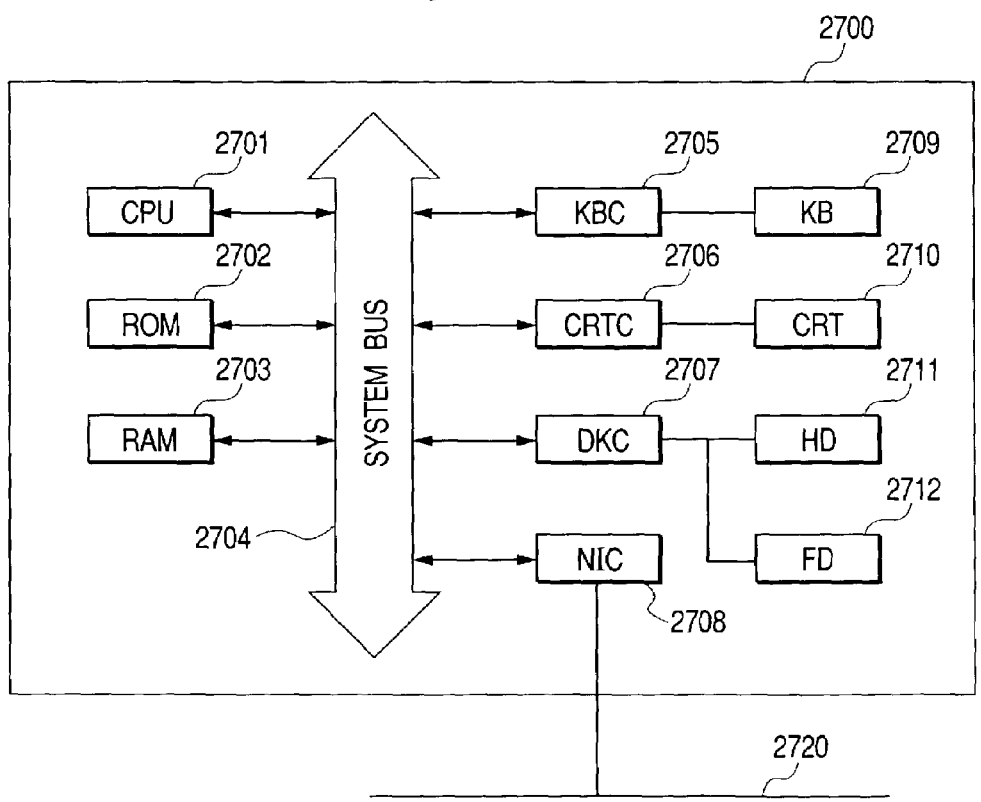
FIG. 26 is a view showing the content of camera operation information.
FIG. 27 is a view showing configuration of a computer.

Also for achieving faster collating process of the scene information and the scene rule, the camera operation information provided in the unit of a frame may be managed collectively for each scene section, as shown in FIG. 26, as information of the scene section indicated by the start and end points, the type of camera operation information and the parameters thereof.

In the foregoing embodiments, the frame position is indicated by the frame ID, but it may also be indicated by a time code, and, more generally, there may be employed any information capable of specifying the frame position in the moving image.

Further, the control sequence of the photographing unit 110 shown in FIG. 6 is merely an example and is not restrictive. For example, the camera setting may be rendered variable in the source of photographing of the image.

Also in the foregoing first and third embodiments, the moving image is recorded in the unit of a clip, while, in the foregoing second embodiment, the moving image is divided into the unit of a clip by the cut detection unit 508. Such operation is adopted in consideration of the operability of the user at the scene designation. Therefore, the division into the unit of a lip is unnecessary if a loss in the operability is tolerated. It is therefore possible to store all the clips in a file in the first and third embodiments, and, in the second embodiment, to dispense with the cut point detecting process.

Also the camera operation information is provided in the format shown in FIG. 7 or 8, but such format is not restrictive and there may be any format including the information indicating the type, existing section, direction etc. of the camera operation information and information indicating strength if necessary.

Also in the third embodiment, in case of violation of the scene rule, it is possible to display a scene corresponding to the scene designating window 1004 in FIG. 10 and also a message window shown in FIG. 12, thereby requesting the depression of an unrepresented confirmation button by the user. In this manner the user can easily confirm the correspondence between the scenes and the scenes violating the scene rule. However, such configuration is again not restrictive, and there may be adopted any other display configuration that can avoid confusion in understanding the correspondence between the scenes in a simultaneous display.

The present invention is applicable not only to a system consisting of plural equipment such as a host computer, an interface equipment, a reader, a printer etc. but also to an apparatus consisting of a single equipment (such as a copying apparatus or a facsimile apparatus).

The objects of the present invention can also be attained by supplying a system or an apparatus with a storage medium storing program codes of a software realizing the functions of the host and terminal equipment of the aforementioned embodiments and causing a computer (or CPU or MPU) of such system or apparatus to read and execute the program codes stored in the storage medium.

In such case, the program codes themselves read from the storage medium realize the functions of the aforementioned embodiments, and the storage medium storing the program codes and such program codes themselves constitute the present invention.

The storage medium for supplying the program codes can be, for example, a ROM, a flexible disk, a hard disk, an optical disk, a magnetooptical disk, a CD-ROM, a CD-R, a magnetic tape or a non-volatile memory card.

Also the present invention includes not only a case where the functions of the aforementioned embodiments are realized by the computer by executing the read program codes, but also a case where an OS (operating system) or the like functioning on the computer executes all the processes or a part thereof under the instructions of such program codes, thereby realizing the functions of the aforementioned embodiments.

The present invention further includes a case where the program codes read from the storage medium are once stored in a memory provided in a function expansion board inserted into the computer or a function expansion unit connected thereto and a CPU or the like provided in such function expansion board or function expansion unit executes all the processes or a part thereof under the instructions of such program codes, thereby realizing the functions of the aforementioned embodiments.

FIG. 27 illustrates such computer function 2700.

The computer function 2700 has a configuration composed of a CPU 2701, a ROM 2702, a RAM 2703, a keyboard controller (KBC) 2705 for a keyboard (KB) 2709, a CRT controller (CRTC) 2706 for a CRT display (CRT) 2710 constituting a display unit, a disk controller (DKC) 2707 for a hard disk (HD) 2711 and a flexible disk (FD) 2712, and a network interface controller (NIC) 2708 for connection with a network 2720, which are connected in mutually communicable manner through a system bus 2704.

The CPU 2701 collectively controls the various component units connected to the system bus 2704, by executing the software stored in the ROM 2702 or the HD 2711 or supplied from the FD 2712. Thus, the CPU 2701 executes control for realizing the functions of the aforementioned embodiments, by reading and executing programs of a predetermined process sequence, from the ROM 2702, HD 2711 or FD 2712.

The RAM 2703 functions as a main memory or a work area for the CPU 2701. The KBC 2705 controls the input of instructions from the KB 2709 or an unrepresented pointing device. The CRTC 2706 controls the display on the CRT 2710. The DKC 2707 controls the access to the HD 2711 and FD 2712, storing a boot program, various applications, editing files, user files, a network management program and the predetermined process programs of the aforementioned embodiments. The NIC 2708 executes bi-directional data exchange with the apparatus or system on the network 2720.

What is claimed is:

1. An image processing apparatus comprising:
    input means for entering moving image data of plural clips and camera operation information relating to the moving image data of the plural clips, each of the plural clips including the moving image data indicating a series of moving images;
    designation means for selecting arbitrary plural clips in the entered moving image data of plural clips and designating an order of reproduction of the selected plural clips; and
    control means for comparing a difference of the camera operation information between two different clips to be reproduced consecutively among the selected plural clips with a predetermined rule relating to the camera operation information, and outputting predetermined warning information when the difference of the camera operation information of the two consecutive clips violates the predetermined rule.

2. An apparatus according to claim 1, wherein the image data are photographed by a video camera, and the camera operation information is information relating to the function or state of the video camera in photographing the moving image data.

3. An apparatus according to claim 2, wherein the camera operation information includes plural items relating to the function and state of the video camera, and the predetermined rule is provided for each of the plural items.

4. An apparatus according to claim 2, wherein the predetermined rule includes a rule relating to the moving direction of the video camera.

5. An apparatus according to claim 2, wherein the predetermined rule is a rule relating to an existing range of the camera operation information and to a change in the content of the camera operation information in the two consecutive clips.

6. An apparatus according to claim 2, further comprising:
display means for displaying plural representative images indicating the image data of the selected plural clips,
wherein said control means outputs the warning information to said display means.

7. An apparatus according to claim 1, wherein the predetermined rule is a rule relating to the camera operation information between the two different clips to be reproduced consecutively.

8. An apparatus according to claim 7, wherein said control means executes the comparison process on all the camera operation information of two consecutive clips among the selected plural clips.

9. An apparatus according to claim 8, wherein said control means outputs information indicating the two clips corresponding to the camera operation information violating the predetermined rule, together with the warning information.

10. An apparatus according to claim 1, wherein said input means includes reproduction means for reproducing the moving image data and the camera operation information from a storage medium.

11. An image processing apparatus comprising:
image pickup means;
recording means for recording, on a storage medium, moving image data obtained by said image pickup means and camera operation information relating to the function state of said image pickup means, said recording means recording the moving image data obtained from a recording start instruction to a recording stop instruction as one clip;
reproducing means for reproducing the moving image data and the camera operation information from said storage medium;
designation means for selecting arbitrary plural clips in the moving image data of plural clips reproduced by said reproducing means and designating an order of reproduction of the selected plural clips; and
control means for comparing a difference of the camera operation information between two different clips to be reproduced consecutively among the selected plural clips with a predetermined rule relating to the camera operation information, and outputting predetermined warning information when the difference of the camera operation information of the two consecutive clips violates the predetermined rule.

12. An image processing method comprising:
an input step of entering moving image data of plural clips and camera operation information relating to the moving image data of the plural clips, each of the plural clips including the moving image data indicating a series of moving images;

a designation step of selecting arbitrary plural clips in the entered moving image data of the plural clips and designating an order of reproduction of the selected plural clips; and a control step of comparing a difference of the camera operation information between two different clips to be reproduced consecutively among the selected plural clips with a predetermined rule relating to the camera operation information, and outputting predetermined warning information when the difference of the camera operation information of the two consecutive clips violates the predetermined rule.

13. An image processing method comprising:
an image pickup step;
a recording step of recording, on a storage medium, moving image data obtained in said image pickup step and camera operation information relating to the function state of said image pickup step, said recording step recording the moving image data obtained from a recording start instruction to a recording stop instruction as one clip;
a reproducing step of reproducing the moving image data and the camera operation information from the storage medium;
a designation step of selecting arbitrary plural clips in the moving image data of plural clips reproduced in said reproducing step and designating an order of reproduction of the selected plural clips; and
a control step of comparing a difference of the camera operation information between two different clips to be reproduced consecutively among the selected plural clips with a predetermined rule relating to the camera operation information, and outputting predetermined warning information when the difference of the camera operation information of the two consecutive clips violates the predetermined rule.

14. An image processing apparatus comprising:
input means for entering moving image data of plural clips and camera operation information relating to the moving image data of the plural clips, each of the plural clips including the moving image data indicating a series of moving image;
designation means for selecting arbitrary plural clips in the entered moving image data of plural clips and designating an order of reproduction of the selected plural clips; and
control means for outputting predetermined warning information according to a difference of the camera operation information between two different clips to be reproduced consecutively among the selected plural clips.

15. An image processing apparatus according to claim 14, wherein the camera operation information comprises information regarding a white balance mode.

16. An image processing apparatus according to claim 14, wherein the camera operation information comprises information regarding whether an automatic focusing mode or manual focusing mode is used.

17. An image processing apparatus according to claim 14, wherein the camera operation information comprises information regarding a focused distance.

18. An image processing apparatus according to claim 14, wherein the camera operation information comprises information regarding whether a zoom button is on or off.

19. An image processing apparatus according to claim 14, wherein the camera operation information comprises information regarding a direction of zoom.

20. An image processing apparatus according to claim 14, wherein the camera operation information comprises information regarding an intensity of zoom.

21. An image processing apparatus according to claim 14, wherein the camera operation information comprises information regarding whether or not panning takes place.

22. An image processing apparatus according to claim 14, wherein the camera operation information comprises information regarding a direction of panning.

23. An image processing apparatus according to claim 14, wherein the camera operation information comprises information regarding an intensity of panning.

* * * * *

UNITED STATES PATENT AND TRADEMARK OFFICE
CERTIFICATE OF CORRECTION

PATENT NO. : 7,391,436 B2
APPLICATION NO. : 10/216748
DATED : June 24, 2008
INVENTOR(S) : Hiroshi Tojo It is certified that error appears in the above-identified patent and that said Letters Patent is hereby corrected as shown below:

IN THE DRAWINGS:
Sheet 15, FIG. 18, Steps S1804 and S1805, "SIMILAR" should read --SIMILARITY--.
Sheet 21, FIG. 26, "RIGTH" should read --RIGHT--.

COLUMN 1:
Line 25, "zooming etc." should read --zooming, etc.,--.
Line 43, "example" should read --example,--.

COLUMN 3:
Line 7, "converter etc." should read --converter, etc.,--.
Line 45, "button etc." should read --button, etc.,--.
Line 53, "control the" should read --controls the--.

COLUMN 5:
Line 65, "achieved for example" should read --achieved, for example,--.

COLUMN 6:
Line 34, "are for example" should read --are, for example,--.
Line 35, "example" should read --example, the--.
Line 41, "FIG. 10" should read --FIG. 10,--.
Line 55, "read" should read --reads--.

COLUMN 7:
Line 3, "same" should read --the same--.
Line 7, "same" should read --the same--.

COLUMN 9:
Line 18, "the the" should read --the--.
Line 27, "composed for example" should read --composed, for example,--.

COLUMN 11:
Line 19, "1R" should read --iR--.
Line 23, "1B" should read --iB--.
Line 25, "1R" should read --iR--.
Line 29, "1B" should read --iB--.

COLUMN 12:
Line 61, "same" should read --the same--.

UNITED STATES PATENT AND TRADEMARK OFFICE
CERTIFICATE OF CORRECTION

PATENT NO. : 7,391,436 B2
APPLICATION NO. : 10/216748
DATED : June 24, 2008
INVENTOR(S) : Hiroshi Tojo It is certified that error appears in the above-identified patent and that said Letters Patent is hereby corrected as shown below:

COLUMN 13:
Line 39, "dissolving etc." should read --dissolving, etc.--.

COLUMN 14:
Line 15, "is shows" should read --is shown--.

COLUMN 15:
Line 39, "should" should read --should be--.

COLUMN 16:
Line 67, "lens etc." should read --lens, etc.,--.

COLUMN 17:
Line 33, "direction etc." should read --direction, etc.,--.
Line 49, "printer etc." should read --printer, etc.,--.

COLUMN 20:
Line 44, "image;" should read --images;--.

Signed and Sealed this

Thirtieth Day of December, 2008

JON W. DUDAS
*Director of the United States Patent and Trademark Office*